(12) United States Patent
Weinerman et al.

(10) Patent No.: US 11,400,888 B1
(45) Date of Patent: Aug. 2, 2022

(54) COMMERCIAL VEHICLE ACCESS CONTROL SYSTEM

(71) Applicant: The Eastern Company, Strongsville, OH (US)

(72) Inventors: Lee S. Weinerman, Medina, OH (US); Keith Braun, Strongsville, OH (US); James Paxitzis, Strongsville, OH (US)

(73) Assignee: THE EASTERN COMPANY, Cleveland, OH (US)

( * ) Notice: Subject to any disclaimer, the term of this patent is extended or adjusted under 35 U.S.C. 154(b) by 54 days.

(21) Appl. No.: 17/096,148

(22) Filed: Nov. 12, 2020

Related U.S. Application Data

(60) Provisional application No. 62/937,889, filed on Nov. 20, 2019.

(51) Int. Cl.
| | |
|---|---|
| *B62D 33/037* | (2006.01) |
| *B60R 25/24* | (2013.01) |
| *B60R 25/01* | (2013.01) |
| *B60R 25/104* | (2013.01) |
| *B60R 25/30* | (2013.01) |
| *B60R 25/25* | (2013.01) |
| *B60R 25/34* | (2013.01) |
| *H04N 7/18* | (2006.01) |
| *G01S 17/931* | (2020.01) |

(Continued)

(52) U.S. Cl.
CPC ............. *B60R 25/24* (2013.01); *B60R 25/01* (2013.01); *B60R 25/104* (2013.01); *B60R 25/257* (2013.01); *B60R 25/305* (2013.01); *B60R 25/34* (2013.01); *G01G 19/08* (2013.01); *G01S 17/931* (2020.01); *G01S 19/01* (2013.01); *G06V 40/172* (2022.01); *H04N 7/15* (2013.01); *H04N 7/181* (2013.01); *B60R 2025/1013* (2013.01); *B60R 2325/205* (2013.01)

(58) Field of Classification Search
CPC ....... B60R 25/24; B60R 25/01; B60R 25/104; B60R 25/257; B60R 25/305; B60R 25/34; B60R 2025/1013; B60R 2325/205; G01G 19/08; G01S 17/931; G01S 19/01; G06V 40/172; H04N 7/15; H04N 7/181
See application file for complete search history.

(56) References Cited

U.S. PATENT DOCUMENTS

| | | | | |
|---|---|---|---|---|
| 7,629,873 B2 * | 12/2009 | Ghabra | ............. | G07C 9/00309 340/5.25 |
| 10,951,728 B2 * | 3/2021 | Lepp | ............. | H04W 4/48 |

(Continued)

*Primary Examiner* — Munear T Akki
(74) *Attorney, Agent, or Firm* — Ralph E. Jocke

(57) ABSTRACT

A commercial vehicle access control system provides selective access to authorized users to interior areas of respective service vehicle item storage compartments. The compartments are usable to house items such as tools, equipment, materials or products that are removed from or placed in such compartments. A system controller is in operative connection with a plurality of electrically actuated door locks which can be operated responsive to communication with a portable wireless device to enable access to selected compartments and the items which are housed therein. A plurality of vehicle cameras and other sensors are operative to detect activities related to the removal from or placement of items within the compartments, as well as other conditions associated with the operation and status conditions of the vehicle.

28 Claims, 8 Drawing Sheets

(51) Int. Cl.
  *G01S 19/01* (2010.01)
  *G01G 19/08* (2006.01)
  *H04N 7/15* (2006.01)
  *G06V 40/16* (2022.01)
  *B60R 25/10* (2013.01)

(56) References Cited

U.S. PATENT DOCUMENTS

| | | | |
|---|---|---|---|
| 2008/0036238 A1* | 2/2008 | Weeda | B60P 3/20 |
| | | | 296/146.1 |
| 2019/0226245 A1* | 7/2019 | Fabre | B60R 25/241 |
| 2020/0086931 A1* | 3/2020 | Zelent | E05B 45/083 |
| 2020/0090117 A1* | 3/2020 | Luo | G06Q 10/083 |
| 2020/0101903 A1* | 4/2020 | Skikun | F41A 23/26 |
| 2020/0148125 A1* | 5/2020 | H N | B60R 7/087 |
| 2020/0160633 A1* | 5/2020 | Zhang | G07C 9/00309 |
| 2021/0101563 A1* | 4/2021 | Azarko | G06F 16/9035 |

\* cited by examiner

COMMERCIAL VEHICLE ACCESS CONTROL SYSTEM

TECHNICAL FIELD

Exemplary arrangements relate to an access control system for a commercial vehicle, such as a vehicle used in field service activities or in making deliveries of items at various locations.

BACKGROUND

Commercial service vehicles are used in service industries of various types. For example, in the construction and utility industries service vehicles are utilized to carry the tools, equipment and materials needed by workers to perform activities at a construction or repair site. Commercial service vehicles are also utilized in the hardware, food service, consumer-products and other industries to deliver items to customers or to retail outlets. Commercial service vehicles are also used in numerous other industries.

Numerous different types of commercial service vehicles include a plurality of separate compartments for storing items therein. In some arrangements because the stored items have significant value it is often desirable to lock the compartments to prevent unauthorized persons from gaining access to the compartments and the valuable items stored therein.

Access control systems for commercial service vehicles that limit access to compartments of the vehicle to authorized users may benefit from improvements.

SUMMARY

Exemplary arrangements described herein relate to a system that is operative to selectively control access to a plurality of compartments on a service vehicle. In one exemplary —arrangement the service vehicle is of the type that holds tools and materials that are utilized in construction or repair service activities.

The exemplary vehicle includes a respective door associated with each respective item storage compartment that is operative to control access to the interior area of the respective compartment. A respective door sensor associated with each door is operative to detect whether the door is in at least one of the door open and door closed positions. An electrically actuated door lock is associated with each respective door. Each lock is selectively changeable between a locked condition and an unlocked condition. In the locked condition each lock is operative to hold a respective door in the door closed position.

In an exemplary arrangement each of the plurality of door locks and door sensors is in operative connection with a controller. The exemplary controller includes at least one processor circuit and at least one data store that includes controller identifying data. The controller is also in operative connection with at least one wireless transceiver and an audible annunciator.

A portable wireless device that includes at least one input device, a data store and a transceiver is operative to communicate wireless messages with the controller. In the exemplary arrangement the portable wireless device is operative to communicate wireless messages that include data corresponding to portable device identifying data and at least one lock instruction to the controller. The controller is operative to receive the wireless device messages and make a determination that the device identifying data included in the wireless messages has a predetermined relationship to stored controller identifying data. Responsive at least in part to the determination and the lock instruction data, the controller is operative to cause at least one lock associated with at least one storage compartment to be changed between the locked and unlocked conditions. The exemplary controller is further operative to cause the audible annunciator to provide at least one audible output when a door is sensed as not in the closed door position but the controller has not caused the respective lock to be enabled to be in the unlocked condition. Numerous additional features and capabilities are provided in exemplary arrangements.

DETAILED DESCRIPTION

Figure 1:
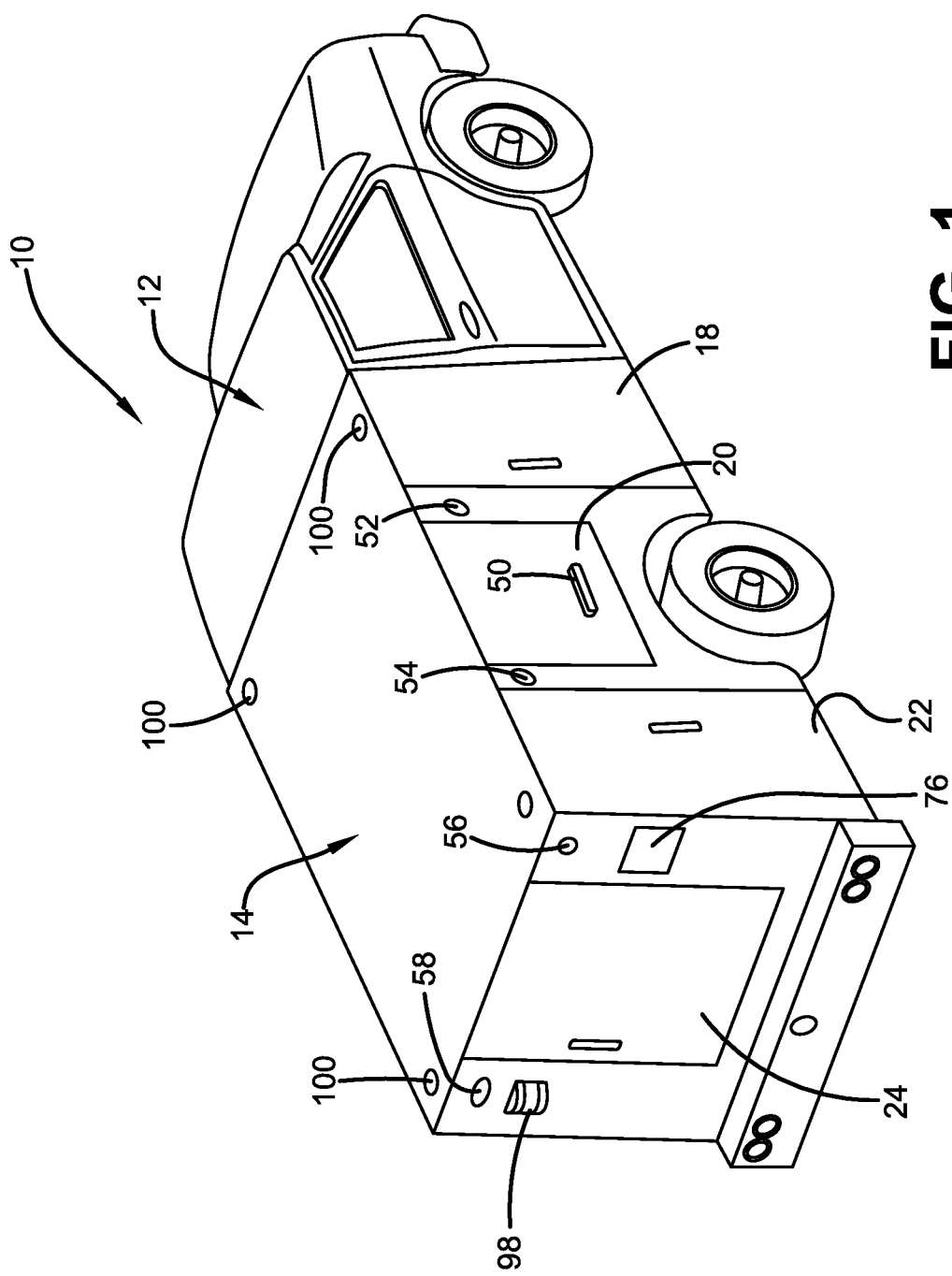
FIG. 1 is a perspective view of a service vehicle including an access control system of an exemplary arrangement.

Referring now to the drawings and particularly to FIG. 1 there is shown therein an exemplary service vehicle generally indicated 10. The exemplary vehicle 10 is in the nature of a commercial vehicle that can be used in services industries for purposes of holding items such as tools, equipment, supplies and materials that are utilized in connection with providing services associated with repairs or construction of items or facilities. It should be understood that the type of vehicle shown is exemplary and the features described herein may be used in connection with other types of commercial services vehicles that perform other functions such as providing the transport and delivery of items to persons or retail establishments, or other types of commercial or personal transport and storage.

The exemplary service vehicle 10 includes a cab 12. The cab 12 houses the vehicle operator and other occupants. The exemplary vehicle further includes a body 14. The exemplary body is utilized for purposes of holding the items such as tools, equipment, supplies and materials that are stored in and transported by the vehicle.

Figure 2:
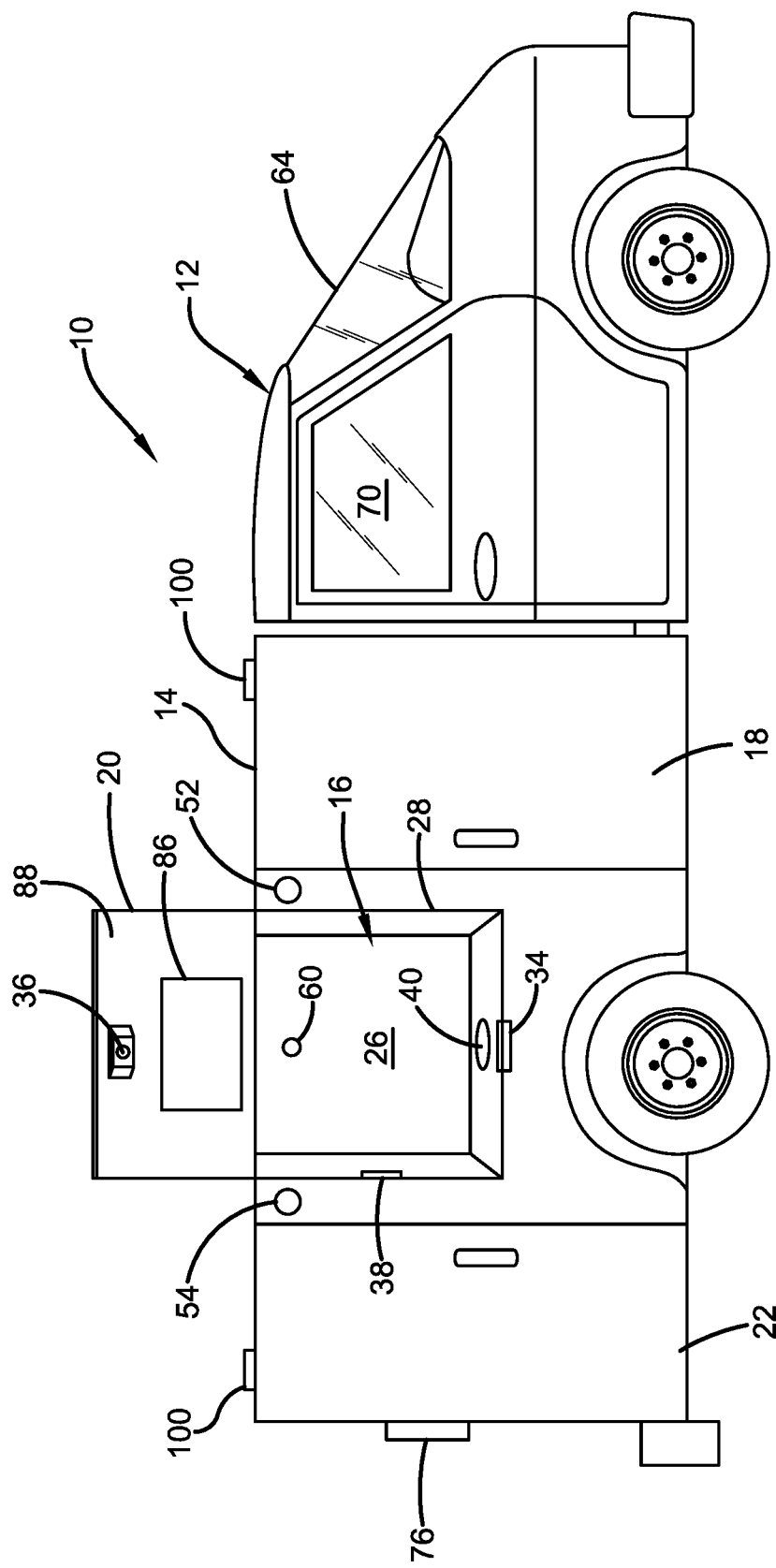
FIG. 2 is a side view of the service vehicle of FIG. 1 with a storage compartment in an open condition.

The exemplary body includes a plurality of service vehicle item storage compartments therein such as compartment 16 that is shown in the open condition in FIG. 2. In the exemplary arrangement each service vehicle item storage compartment is associated with a compartment door, such as doors 18, 20, 22 and 24 each of which is associated with a respective service vehicle compartment. Each item storage compartment includes a respective interior area. For example, compartment 16 has an interior area 26 which has an opening 28 thereto. The opening provides external access to the interior area of the respective compartment when the associated compartment door is in the door open position. This is shown for example by compartment door 20 in the open position in FIG. 2. This is further shown by compartment door 22 which is shown in an open position in FIG. 6 which provides access through an opening 30 to compartment interior area 32. Of course it should be understood that the arrangement of compartments and doors shown in connection with the body 14 is exemplary and numerous different types of compartments and access arrangements may be utilized.

In the exemplary arrangement at least some of the service vehicle item storage compartments in the body 14 have an associated electrically actuated door lock such as door lock 34 which is shown in connection with compartment 16. The exemplary door lock 34 is operative to engage and selectively hold or release a strike 36 that is associated with the compartment door 20. In an exemplary arrangement the electrically actuated door locks may be of the type described in U.S. Pat. Nos. 10,676,208 and/or 9,809,999, the disclosures of each of which are incorporated herein by reference in their entirety. Of course in other arrangements other types of locks may be used.

Each compartment door of the exemplary body 14 has associated therewith a door sensor 38. Each door sensor 38 is in operative connection with the associated door 20. In the exemplary arrangement the door sensor is operative to sense the door in at least one of the door open position or the door closed position. In this manner the door sensor is enabled to detect at least one position of the door which may be useful in determining numerous different access conditions related to the respective service vehicle compartment as later discussed. For example in some exemplary arrangements a door sensor may be operative to detect if the associated compartment door is in the closed position or has been moved away from the closed position. Further it should be appreciated that in some exemplary arrangements the respective door sensor may be in operative connection with or integrated as part of the associated door lock for the respective compartment door. Such sensors may be operative to sense the position of the door by sensing a position of a component of the lock which is in operative connection with the door when the door is in the closed position.

In an exemplary arrangement at least some compartments may include a weight sensor therein such as weight sensor 40 shown in the interior area 26 of compartment 60. In exemplary arrangements the weight sensor is operative to detect the weight and/or a change in weight of items housed in the compartment and in contact with at least one surface bounding the compartment interior area. In exemplary arrangements weight sensors may be of the piezoelectric type, electrical resistance type or other suitable type that is operative to detect the weight of items housed in the interior area. Of course it should be understood that in some exemplary arrangements a plurality of weight sensors may be utilized for purposes of detecting the weight of the contents of a compartment. For example in some arrangements a compartment surface may include a matrix including a plurality of sensors to detect the force created by the weight of the contents at a plurality of locations on a compartment surface on which items are supported. In other exemplary arrangements a plurality of weight sensors may be utilized in connection with subareas of some compartments of an interior area. This may include for example, the weight in each of subcompartments 42, 44, 46 and 48 of interior area 32 shown in FIG. 6 for example. Of course these approaches are exemplary and other arrangements other approaches may be used.

In the exemplary arrangement shown each of the service vehicle compartment doors is associated with a respective externally accessible door handle. Each door handle such as door handle 50 which is associated with compartment door 20 is externally accessible when the door is in the closed position. The handle is configured to be manually engageable to move the door between the door open and closed positions. Further in some exemplary arrangements at least some door handles may be associated with a mechanically releasable lock, such as a keylock that enables the respective compartment door to be opened through use of a corresponding mechanical key without actuation of the corresponding electrically actuated lock. Such an approach may be used in some arrangements so that authorized users may gain access to vehicle item storage compartments in the event of an access control system malfunction or the loss of electrical power. Such manually actuatable unlocking mechanisms may include features like those shown in the incorporated disclosures or other suitable unlocking mechanisms.

In the exemplary arrangement the service vehicle includes a plurality of vehicle cameras such as external cameras 52, 54, 56 and 58 shown in FIG. 1. It should be understood that the external cameras are operative to capture image data corresponding to images within a field of view external to the side of the body 14 on which the respective camera is positioned. Numerous different external cameras with different fields of view may be provided in connection with the vehicle body. Vehicle cameras may also include one or more cameras positioned within a respective vehicle compartment. This includes for example camera 60 which is positioned to capture image data corresponding to the interior area 26 of compartment 16. In the exemplary arrangement the one or more vehicle cameras located in a respective compartment may be operative to capture image data corresponding to images of items in the compartment interior area. Such cameras may also be operative to capture images through the respective compartment opening so that when the respective compartment door is opened image data including an image of the individual opening and/or accessing the compartment can be captured and stored along with time data associated with such access in a manner like that later discussed.

Further in some exemplary arrangements vehicle cameras may be positioned within the vehicle 12. Such vehicle cameras may include for example a vehicle camera 62 that is positioned to capture image data corresponding to windshield images that include a field of view from the interior of the cab of the vehicle through a windshield 64. Other vehicle cameras such as a camera 66 may be positioned to capture image data corresponding to images of an instrument panel 68 within the cab interior area 70. In exemplary arrangements the instrument panel includes one or more output devices such as a speedometer, tachometer, odometer, fuel gauge, oil pressure indicator, voltmeter, compass, trouble indicator, warning indicators, radio or other device output indicators and other output devices which provide information to the driver. In exemplary arrangements cameras 66 may operate to capture images corresponding to outputs from the instrument panel that can be stored through operation of the exemplary system in connection with corresponding time data and other location data in a manner like that later discussed.

In some exemplary arrangements one or more vehicle cameras 72 may be positioned in the cab interior area and include a field of view that includes the occupants of the cab. One or more cameras 72 may be operative to capture image data corresponding to images of the vehicle driver 74 or additionally or alternatively one or more passengers which may be occupants of the cab interior area. In exemplary arrangements such captured occupant images may be stored in correlated relation with corresponding time data in a manner like that later discussed to document occupants the of the vehicle cab at particular times. Of course it should be understood that these arrangements of vehicle cameras are exemplary and in other arrangements other approaches may be used.

In an exemplary arrangement the body 14 may include at least one vehicle user interface 76. In the exemplary arrangement the vehicle user interface includes or is otherwise in operative connection with at least one visual display 78, an audible output device such as a speaker 80, an audio input device such as a microphone 82 and an image capture device such as a camera 84. Further in other exemplary arrangements the vehicle user interface device may include other input and output devices such as a fingerprint reader, a haptics output device, a token reading device such as a magnetic, infrared, RFID, near field communication (NFC) or Bluetooth interface, or other input and output devices. The exemplary vehicle user interface 76 enables a user to communicate with the circuitry of the exemplary system in a manner like that later discussed.

Further in exemplary arrangements a vehicle user interface may be positioned on or in vehicle compartments of the vehicle body 14. For example, a vehicle user interface such as a touchscreen display 86, may be positioned in operative supported connection with an inside face 88 of a compartment door such as interface door 20. In such arrangements the user interface is in facing relation with the compartment interior when the interface door is in the closed position. The user interface becomes visible externally and accessible to a user only when the compartment door is in the open position. Such a user interface arrangement may enable a user to receive outputs and to provide inputs to the exemplary system through the user interface of the touchscreen display 86 only when the interface becomes accessible through the opening of the respective interface door. Such a user interface may be configured to provide specific outputs and receive specific inputs that are programmed to be related to the particular tools, materials or other items that are supposed to be stored within the respective compartment in which the user interface is positioned. Further such an exemplary arrangement prevents unauthorized access to the user interface which is housed within the compartment until access thereto is gained by an authorized user. Of course it should be understood that these arrangements are exemplary and in other arrangements other approaches may be used.

Figure 6:
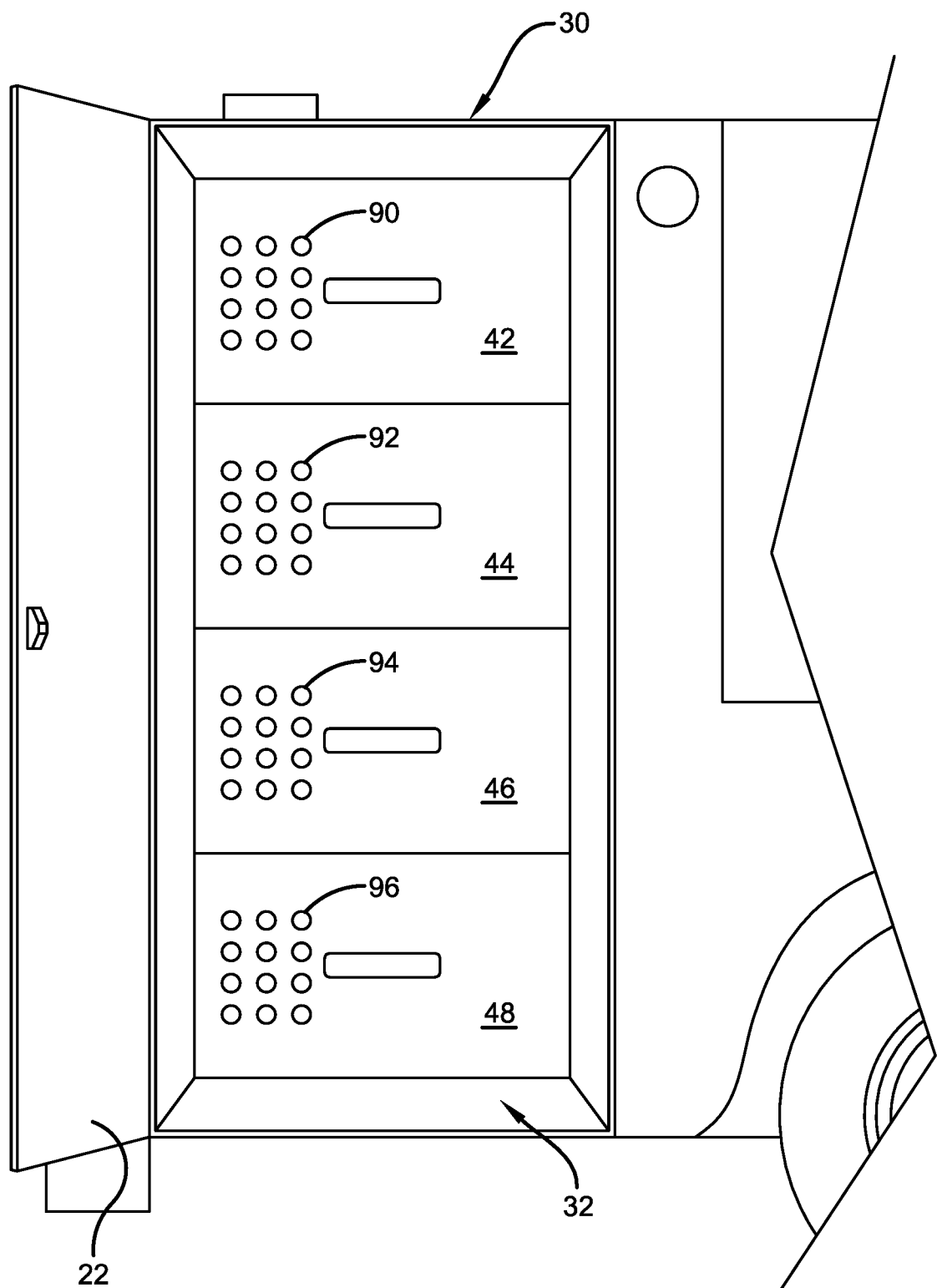
FIG. 6 is a side view of a vehicle compartment shown with a door thereof in a door open position, and access controlled subcompartments within the vehicle compartment.
Figure 7:
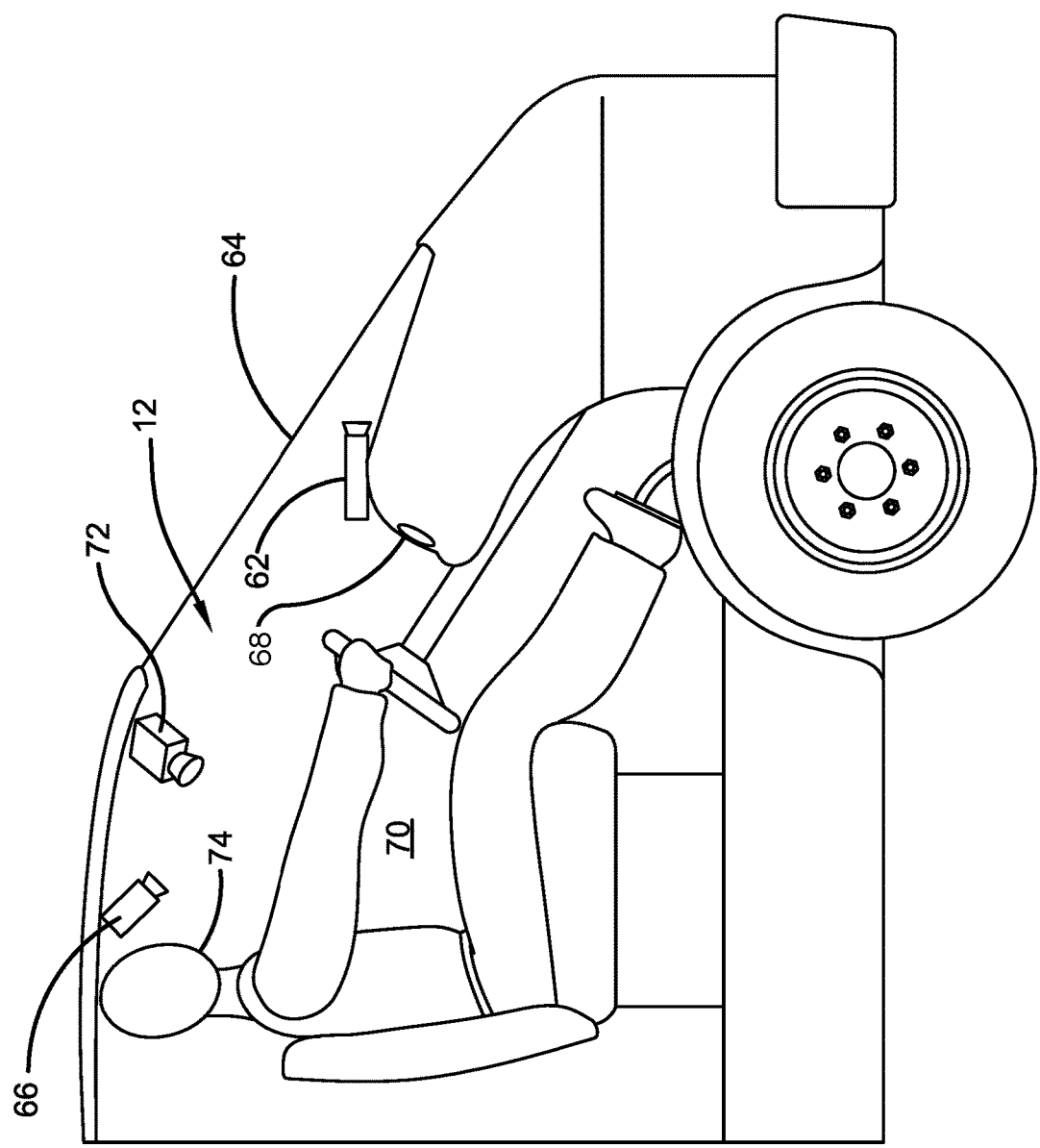
FIG. 7 is a schematic cutaway side view of a cab interior area of the exemplary service vehicle.

In some exemplary arrangements additional user interfaces may be provided in connection with certain compartments or subcompartments of the vehicle body. These may include input and/or output devices that may be a utilized by a user in connection with accessing certain areas or subcompartments and/or in providing information concerning items that are placed in or removed from such areas or subcompartments. For example as shown in FIG. 6, subcompartments 42, 44, 46 and 48 have associated therewith respective user interfaces including input devices 90, 92, 94 and 96 respectively. In exemplary arrangements the input devices may be utilized for purposes of indicating a type and/or number of items that are placed in or removed from the respective subcompartment. This may include for example indicating the taking of certain items in connection with the services being performed so that the inventory of such items can be tracked so that a suitable number of items is maintained as available for use within the storage areas of the body. Such information can be used to restock the vehicle when it returns to its depot or dispatch location. In other exemplary arrangements such inputs associated with the type and/or number of items used may be utilized for purposes of charging the entity who pays for the services that are performed in connection with the entity's receipt of such items. In still other exemplary arrangements inputs through the input devices may include user identification inputs or other inputs indicating the identity or authority of the user to access the particular subcompartment. Such additional inputs to obtain access to a particular subcompartment may be appropriate where the compartment contains controlled materials such as those used for demolition or blasting purposes, controlled items or substances such as narcotics or weapons, or other items to which access is more restricted than items held in other areas of the body or the particular service vehicle compartment. Of course it should be understood that such arrangements are exemplary and in other arrangements other approaches may be used.

In an exemplary arrangement the vehicle body further includes at least one audible annunciator schematically indicated 98. In exemplary arrangements the audible annunciator may include a siren, buzzer, speaker or other device that is operative to selectively provide an audible output which indicates the occurrence of certain conditions like those later discussed in detail. Of course it should be appreciated that in some arrangements multiple audible annunciators may be utilized in connection with the service vehicle including those associated with the vehicle user interfaces or other devices that are included as a part thereof. The exemplary body 14 further includes a plurality of visual output devices 100. The visual output devices may include flashing lights or other suitable indicators. Such output devices may be utilized to provide visual indications of alarm conditions or other conditions that may occur in connection with the operation of the service vehicle. Of course it should be understood that these visual and audible output devices are exemplary and in other arrangements other types of output devices may be used.

Figure 3:
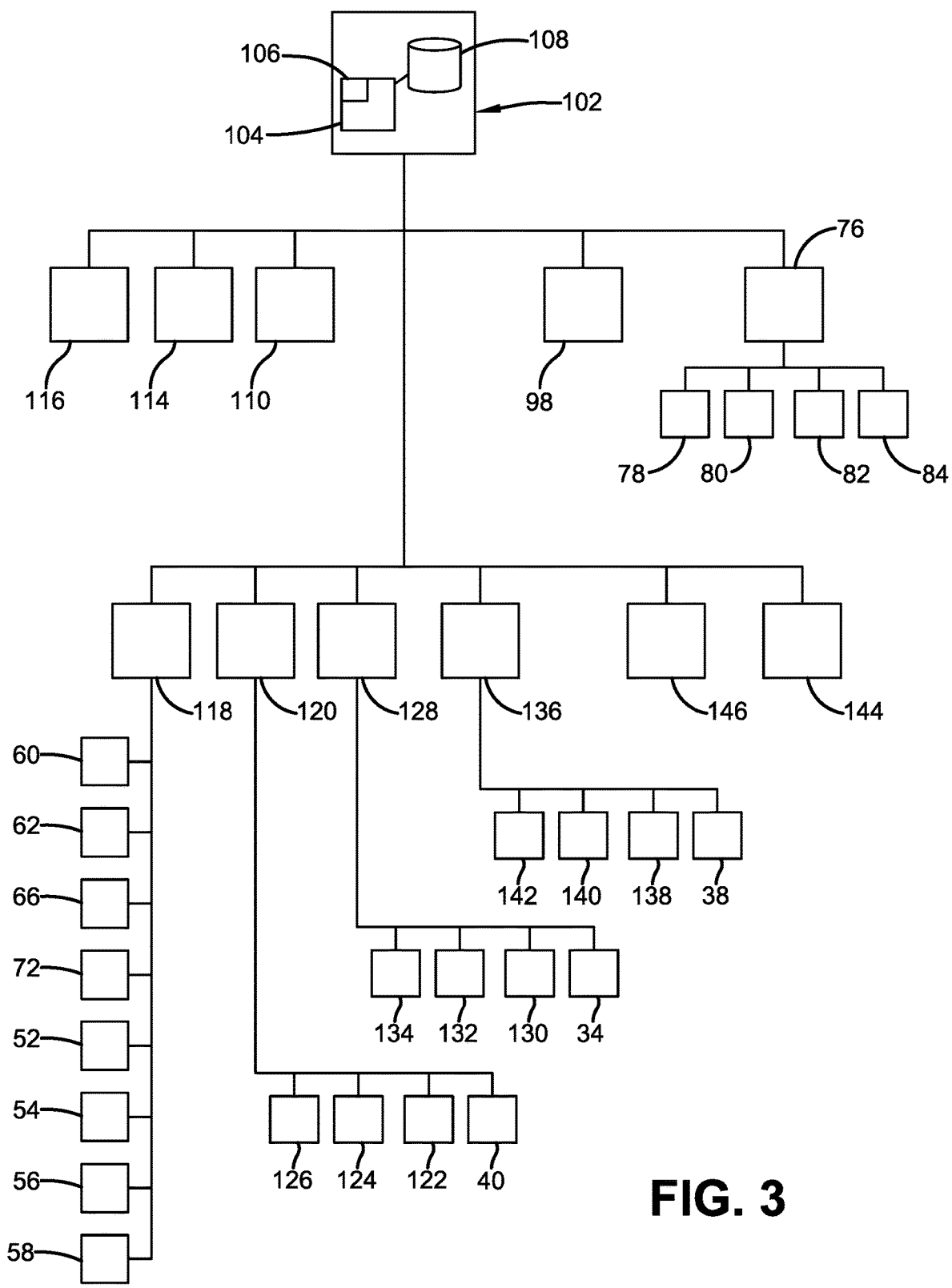
FIG. 3 is a schematic view of circuitry and components of the exemplary access control system.
Figure 4:
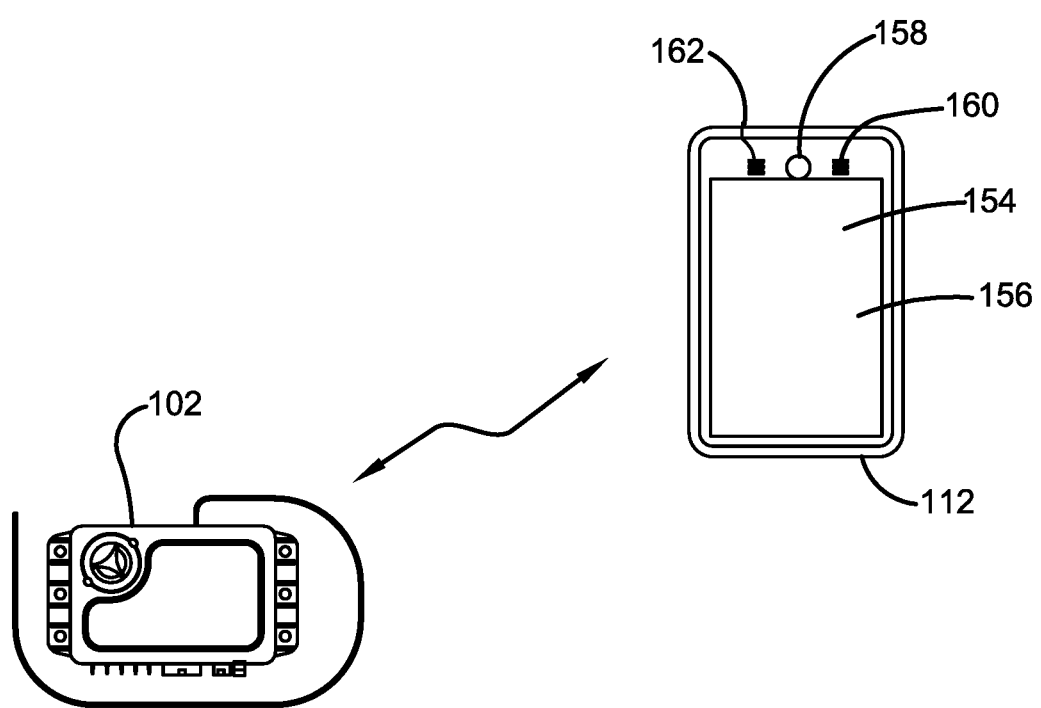
FIG. 4 is a view showing an exemplary portable wireless device used to wirelessly communicate with an exemplary controller of the vehicle access control system.

FIG. 3 schematically shows circuitry and components included in the exemplary vehicle access control system. The exemplary arrangement includes at least one controller 102. The exemplary controller includes circuitry which is operative to control other components of the system. In exemplary arrangements the controller includes at least one processor circuit 104. The exemplary processor circuit includes a clock 106. The clock operates to generate time data associated with the operation and activities of the processor circuit 104. The exemplary controller further includes at least one data store 108. The exemplary data store includes instructions that are executable by the at least one processor circuit as well as stored data that is utilized in connection with the operation of the components of the system. Although only a single central controller is shown in the exemplary arrangement, it should be understood that in other arrangements a plurality of distributed controllers which together perform at least some of the functions described herein may be utilized.

In exemplary arrangements the at least one processor circuit may include one or more or a combination of a CPU, FPGA, ASIC or other integrated circuit or other type of circuit that is capable of processing data and instructions. The one or more data stores may correspond to one or more of volatile or nonvolatile memories such as random access memory, flash memory, read-only memory, programmable read-only memory, optical memory solid-state memory or other devices that are operative to store computer executable instructions and data. Exemplary data stores used in connection with the exemplary arrangements may include one or more of several types of mediums suitable for holding computer executable instructions and data, including for example magnetic media, optical media solid-state media or other form of media suitable for holding data and computer executable instructions. Processor executable instructions may include instructions in any of a plurality of programming languages and formats including, without limitation, routines, subroutines, programs, threads of execution, objects, methodologies, scripts and functions which may carry out the actions such as those described herein. Structures for processor circuitry may include, correspond to and utilize the principles described in the textbook entitled Microprocessor Architecture, Programming and Applications with the 8085 by Ramesh S. Gaonker (Prentice Hall 2002), which is incorporated herein by reference in its entirety.

In exemplary arrangements the controller 102 is in operative connection with the at least one vehicle user interface. This includes user interface 76 previously discussed. The controller 102 is also in operative connection with other user interfaces such as the touchscreen display 86, input devices 90, 92, 94, 96 and other user input and output devices that are associated with the system. The controller is also in operative connection with the audible annunciator 98.

The exemplary controller is further in operative connection with a wireless transceiver 110. The exemplary wireless transceiver comprises a wireless transmitter and a wireless receiver. The transceiver may comprise a suitable chipset or other two-way communication radio which is configured to communicate with at least one portable wireless device 112. The portable wireless device 112 which is later discussed in detail, is configured to be carried by a user who is granted authorized access to the service vehicle compartments and the items contained therein. The at least one wireless transceiver of an exemplary arrangement is further operative to wirelessly communicate with other remote systems. This may include for example communication in local or wide area networks with remote servers and other systems to receive and provide messages and data. Such communications may be via Wi-Fi, cellular network communications, satellite communications or other suitable wireless network communications capabilities as required to achieve the particular operational capabilities of the particular system.

The exemplary system further includes a GPS circuit 114. The GPS circuit 114 is operative to enable the controller or other components of the system to receive and determine location data which indicates a current location of the vehicle. The controller is further in operative connection with at least one biometric reader schematically indicated 116. The at least one biometric reader may include a fingerprint reader, palm vein reader, microphone for voice inputs, iris scanner, retina scanner, facial recognition camera, or other input device for reading a biometric feature of a user. In some exemplary arrangements the vehicle cameras, microphone, fingerprint reader or other input device that is included in another system component such as the vehicle user interface or the portable wireless device may comprise the biometric reader used in the system operation. It should be understood that these examples of biometric readers are exemplary and other arrangements other types of biometric readers may be utilized.

The exemplary controller 102 is further in operative connection in the system with the vehicle cameras. At least one suitable camera interface 118 enables the controller to receive the image data corresponding to images that are captured through vehicle cameras that are included in the service vehicle compartments such as camera 60 previously discussed. External cameras 52, 54, 56, 58 and other external cameras are also in operative connection with the controller. Likewise, cameras such as the windshield camera 62, instrument panel camera 66 and cab occupant camera 72 as well as other cameras are in operative connection with the controller as represented in FIG. 3.

Weight sensors that are positioned in the storage compartments such as weight sensor 40, are in operative connection with the controller through at least one weight sensor interface 120. Other weight sensors 122, 124 and 126 as well as others which may positioned in item storage compartments, subcompartments or other areas are also in operative connection with the controller through the interface 120. Of course it should be understood that numerous different numbers of weight sensors may be utilized in connection with various arrangements.

Electrically actuated door locks that are utilized to control access to the vehicle storage compartments such as door lock 34 are in operative connection with the controller 102 through a lock interface 128. Additional door locks 130, 132 and 134 are also shown schematically in operative connection with the controller through the lock interface 128. The exemplary door locks may be of the type that disengage the associated respective door therefrom in response to electrical signals from the controller. In other arrangements the door locks may be of the type that enable a user to disengage the lock through movement of a handle or other member after the lock has been placed in an unlocked condition through one or more signals from the controller. Of course it should be understood that arrangements may include various numbers and types of electrically actuated door locks depending on the number of vehicle storage compartments and subcompartments to which access is controlled.

The door sensors such as door sensor 38 which was previously discussed are in operative connection with the controller 102 through a door sensor interface 136. As previously mentioned the door sensors are operative to provide signals which indicate whether the respective compartment (or subcompartment) door is in at least one of the open or closed position. For purposes of this disclosure, the open position may include partially open. Additional door sensors 138, 140 and 142 are also schematically represented in FIG. 3 as in operative connection with the controller 102 through the interface 136. Of course it should be understood that different numbers and types of door sensors may also be utilized in exemplary systems for purposes of detecting the positions of various associated doors or other members that are moved to obtain access to item storage compartments.

The exemplary system further includes output devices represented schematically 144. Such output devices may include in exemplary arrangements visual output devices such as the output devices 100 previously discussed. Such output devices may also include strobe lights or flashing lights included on the vehicle for purposes of giving warnings or providing visual indications of particular conditions. Such output devices may also include the vehicle headlights, taillights, emergency flashers or other indicators. Other output devices in exemplary arrangements may include output devices such as the vehicle horn or a vehicle siren. In other exemplary arrangements such output devices may include a radio frequency tracking beacon circuit that indicates the location of the vehicle so that the vehicle may be tracked. Such a tracking beacon circuit may be included as part of or may be in addition to the GPS locator circuitry. Such a tracking beacon may be useful for purposes of determining the whereabouts of the vehicle for maintaining information related to activities, deliveries, payment of tolls, payment of taxes, and tracking the vehicle or components thereof in the event of theft or unauthorized use. Other output devices may include circuitry configured to give notifications to particular remote systems in the event that certain conditions may occur. This may include for example giving warnings to particular emergency agencies and/or in the event that an alarm condition is detected in a vehicle that holds explosive or other hazardous material, for example. Numerous different types of output devices may be included in exemplary systems depending on the particular functions associated with the vehicle access control system.

Further in exemplary arrangements in which the body 14 may be provided by a manufacturer that is different than the provider of the vehicle chassis, which includes the drive train and cab area, the exemplary output devices may include an interface between the controller 102 and the vehicle control system provided by the chassis manufacturer. Such an interface may provide for the communication of signals corresponding to an alarm that is detected through operation of the controller. Such an interface may also cause alarm devices such as the headlights and horn associated with the vehicle chassis to output alarm indications in conjunction with output devices located on or in connection with the body. Other exemplary arrangements may enable communication of information that is detected through operation of the controller which causes the electronic control system for the chassis to modify its operation in response thereto. For example in situations where a fire or other dangerous condition is detected within the service vehicle item storage compartments of the body 14, the controller 102 may operate to send through the user interface at least one signal that causes the vehicle chassis to shut down operation of the vehicle or take other appropriate measures. In this manner the continued operation of the vehicle by the driver in dangerous or inappropriate circumstances is prevented. Numerous other interface functions between the system including the controller 102 and the vehicle control system associated with the chassis of the vehicle may be provided in exemplary arrangements.

Exemplary arrangements may further include additional types of input devices schematically indicated 146. Such input devices may include for example, sensors that are operative to detect smoke, flame and/or heat within the vehicle storage compartments. Such sensors may be operative to detect a fire condition so that the controller 102 may operate in accordance with its programming to actuate alarm devices, actuate an automatic fire extinguisher and/or to send remote wireless signals to the user portable wireless device or other remote systems regarding the particular condition. Other temperature sensors may also be utilized for purposes of detecting unduly warm or cold temperatures which may be harmful to certain materials such as medications, biological materials, certain chemicals or other items that may sustain damage or unsafe conditions in response to temperatures above or below certain ranges. The controller may operate in accordance with its programming to provide local or remote alarms or to send wireless messages to remote devices and systems related to the detection of such conditions. Other exemplary sensors may include sensors that detect leakage of liquids or gases from containers within the vehicle. Other sensors may include seismic detectors which are indicative of attack or forcible entry to the vehicle compartments. Motion sensors may be utilized as well for purposes of detecting unauthorized access or movement of the vehicle such as may be associated with hijacking of the vehicle.

In other exemplary arrangements sensors as represented schematically by input devices 146 may further include intrusion sensors. Such sensors may include sonic sensors, conductive sensors or other sensor types that are operative to indicate the breach of doors or other structural components of the body or other unauthorized access to the vehicle. Other sensors may include LIDAR sensors that are operative to sense conditions which correspond to objects either in or in proximity to the vehicle. For example LIDAR sensors may be utilized to identify persons or vehicles in proximity to the sensors so as to identify a situation where a person is in proximity to the vehicle so that the controller may operate in accordance with its programming to activate vehicle user interfaces or other devices. The presence of such vehicles, objects, or persons may be determined by the circuitry using item type identification data that is stored in the at least one data store which is indicative of the type of object that corresponds to the LIDAR data sensed through operation of the LIDAR sensors. LIDAR sensors may also be operative to identify situations representing the approach of unauthorized persons who may be planning an attack or hijacking of the vehicle. LIDAR sensors may also be utilized by the controller circuitry in conjunction with stored object type identification data to identify a particular object such as a particular tool which is carried in the vehicle and removed therefrom by users for operational or service purposes. For example LIDAR imagery may be used to identify that a particular item of equipment has been removed from the vehicle and a record of such removal and the time thereof may be recorded through operation of the controller in the at least one data store. Further the controller may be operative responsive to identifying a particular item type responsive to the LIDAR data as one that is not authorized to be removed from the vehicle, or taken by the particular user, to cause the audible annunciator to provide any indication thereof via an audible output and/or to cause other actions to be taken. Further in exemplary arrangements the controller may operate responsive to the LIDAR data from the LIDAR sensors to identify such item and determine the return of such an item of equipment and placement into storage in a compartment of the vehicle. In this way, the controller associated with the system may be able to automatically keep track of items that are removed from and are returned to or otherwise placed in the vehicle by the detected configuration and movement features of the particular item so that it can be assured that items are not inadvertently lost or left at worksites or other locations. Of course it should be understood that these types of sensors and approaches are exemplary and other arrangements other or additional types of approaches and sensors may be utilized.

Figure 5:
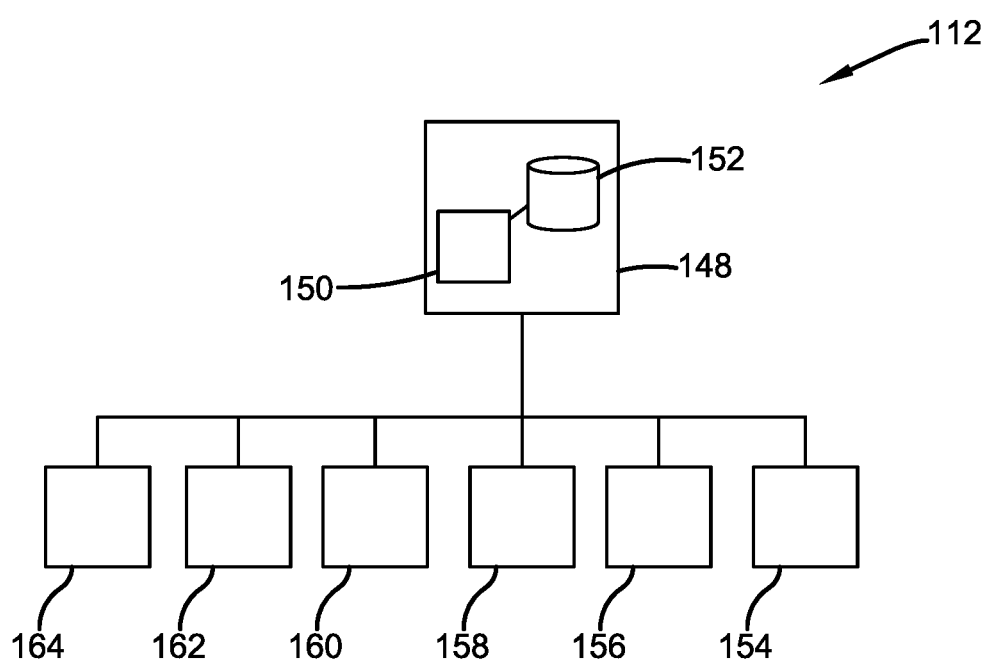
FIG. 5 is a schematic view of circuitry and components of an exemplary portable wireless device used with the exemplary system.

In exemplary arrangements the portable wireless device 112 that is utilized in connection with the system is operative to communicate with the controller 102 through wireless messages so that a user of the portable device may have authorized access to the vehicle storage compartments and the items therein. The exemplary portable user device may also be utilized to carry out other functions and activities associated with exemplary systems. The exemplary portable wireless device is shown schematically in FIG. 5. It includes at least one circuit 148. The at least one circuit 148 includes a processor 150 and a data store 152 which may have structures like that previously discussed. The exemplary wireless device further includes a portable display 154 such as an OLED or other visual display. Such a display is operable to display images, text and other indicia. The portable wireless device further includes at least one input device 156. The input device 156 may include a touch screen that enables providing inputs through manual or stylus contact with the display. Of course other types of portable input devices may also be utilized in connection with exemplary arrangements.

The exemplary portable wireless device further includes a portable camera 158. The portable camera may be operative to capture image data. Such image data may also include facial data, iris data or other similar data such that the portable camera can be used as a biometric input device. In some exemplary arrangements the portable wireless device may also include a fingerprint reader, a palm vein readier or other biometric reader. Of course in other arrangements other types of biometric sensors such as those previously discussed may be utilized and included in the portable wireless device.

The exemplary portable wireless device further includes an audible input device such as a microphone 160 and a portable output device such as a speaker 162. The exemplary microphone and speaker enables the portable wireless device to receive audible inputs and provide audible outputs respectively from the device. Further in exemplary arrangements the microphone may also serve as a biometric input device for receiving voice recognition data which may comprise voiceprint data and/or voice inputs that can serve as instructions, passwords or other input data.

The exemplary portable wireless device 112 further includes at least one wireless portable transceiver 164. The portable transceiver includes a wireless receiver for receiving radio frequency (RF) signals as well as a transmitter for transmitting RF signals. The transceiver is suitable for communicating with wireless transceiver 110 previously discussed. In addition exemplary arrangements may also be operative to communicate with other devices via Wi-Fi, cellular network or other wireless networks. Alternatively or in addition wireless transceivers included in the portable wireless device may include NFC, Bluetooth or other wireless communications chip sets to provide wireless communications capabilities.

In some exemplary arrangements the portable wireless device may be a device that is specifically built for purposes of operating as part of the vehicle access control system. In alternative arrangements the portable wireless device may be a commercially available multi-purpose device such as a smart phone that includes suitable processor circuit executable instructions that are operative to enable the portable wireless device to provide the capabilities as described herein. Further it should be understood that some arrangements may provide only some of the capabilities discussed herein, or may provide additional or different capabilities than those referred to herein as being provided in the exemplary arrangement.

In exemplary arrangements the system enables authorized users to obtain access to service vehicle compartments and the items that are stored therein. The at least one data store 108 of the controller 102 includes stored controller identifying data. The stored controller identifying data may include in exemplary arrangements, portable device identifying data which has a predetermined relationship to data that may be wirelessly communicated by a portable wireless device of a user who is authorized to access the storage compartments of the vehicle.

Further in exemplary arrangements the at least one data store may include data corresponding to stored biometric user identification data. This may include stored user facial recognition or identification data, voice recognition or identification data, finger print identification data, access control data such as PIN characters, passwords, codes, secret words or other types of data that is associated with an authorized user of the system and that when received by the controller can be utilized to make a determination if the received data has a predetermined relationship with the stored user identifying data. In this way the controller enables certain features of the system to only be operated and utilized by authorized users.

Further in exemplary arrangements the at least one data store may include item type identifying data. Such item type identifying data is associated with particular items that may be removed from or placed in storage compartments. Such item type identifying data may include data usable to identify a particular item or particular type of item. Such item type identifying data may include for example, LIDAR data which corresponds to the particular appearance or configuration of the particular item. Alternatively such item identifying data may include data corresponding to a code or other identifier that is associated with a particular item or item type. This may include for example one or two dimensional barcode data (such as a QR code) which is applied to particular items and which can be read by reader, such as a camera or other barcode reader in connection with the system, and used to identify the particular item or item type. Other types of identifiers may include radiofrequency identification (RFID) identifiers which may be applied to certain items and when read by an RFID reader in connection with the system which produce RF signals that uniquely identify the item or item type. Numerous different types of item identifying data which is correlated with particular items or item types may be stored in the at least one data store. Of course numerous other types of data may be stored in exemplary arrangements as well.

The at least one data store 152 of the exemplary portable wireless device includes wireless device identifying data. The device identifying data corresponds to the particular portable device and/or the user of the device. In some exemplary arrangements when an authorized user of the portable wireless device wishes to open one or more of the service vehicle compartments, the user provides one or more inputs through the portable input device of the portable wireless device. Such inputs may include user identifying data or other data that enables the user to operate or access functions of the device and/or the controller. In some exemplary arrangements the inputs may correspond to a lock instruction for unlocking a lock associated with one particular compartment. In other exemplary arrangements the inputs may correspond to lock instructions for unlocking locks on multiple service vehicle storage compartments. Responsive to at least one input through the portable input device of the portable wireless device, the processor circuit 148 of the portable wireless device is operative to cause at least one wireless message to be sent to the controller 102. In an exemplary arrangement the at least one wireless message includes data corresponding to the portable device identifying data as well as data corresponding to at least one lock instruction. In some arrangements the at least one lock instruction corresponds to an instruction to unlock one or more of the electrically actuated locks that control access to vehicle item storage compartments. In other arrangements the lock instruction data may correspond to an instruction to change a lock condition to a locked condition. In exemplary arrangements the data included in the wireless messages may be encrypted to reduce the risk of unauthorized access to the system.

The exemplary controller 102 operates in accordance with its programming to receive the at least one wireless message from the portable wireless device through operation of the wireless transceiver 110. The controller operates in accordance with the stored executable instructions to make a determination of whether the received data corresponding to the wireless device identifying data has a predetermined relationship with the stored controller identifying data that is stored in the at least one data store 108. In response to a determination that the received wireless device identifying data has the predetermined relationship to the stored data, the controller 102 then operates in accordance with its programming and the lock instruction data included in the at least one wireless message, to cause a change in the locked condition of one or more of the locks that control access to the selected one or more storage compartments. As described herein the unlocked condition of a lock corresponds to arrangements in which no further user action is required by a user to move a closed compartment door associated with the lock from the closed position to an open position as well as to arrangements in which user movement of a handle, button or other member or other action or signal available to a user is required before the user can move a compartment door from the closed position to the open position. In this way the user of the portable wireless device is enabled to obtain access to the interior areas of the respective compartments for purposes of accessing the interior areas and removing items from such compartments or placing items therein.

It should be understood that in some exemplary arrangements the portable device identifying data may include or be accompanied by user identifying data. In such situations the controller operates in accordance with its programming to determine if the received user identifying data has a predetermined relationship to the stored user information in the at least one data store 108. The controller may operate responsive at least in part to determining that the user identifying data received from the mobile wireless device has the predetermined relationship to the stored user data to cause a change in the lock condition of one or more locks. Such user identifying data may include facial recognition data captured by the camera of the portable wireless device. Alternately or in addition such user identifying data may include fingerprint data captured by a fingerprint reader on the portable wireless device. Alternatively or in addition such user identifying data may include voice data or passwords captured through the microphone of the portable wireless device. Of course these types of sources of user identifying data are exemplary and in other arrangements other types of data may be used.

Further in exemplary arrangements the portable user device may also be operated by an authorized user to remotely send wireless messages to the controller which cause the controller to selectively change one or more of the locks from the unlocked condition to the locked condition. This may be done for example to resecure the locks in the locked condition after the respective compartment associated with the lock has been accessed. Alternatively or in addition in exemplary arrangements the controller may operate in accordance with its programming to cause locks that have been changed to the unlocked condition to be returned to the locked condition responsive to a set time having elapsed since the message changing the lock to the unlocked condition, and the respective compartment door being in the closed position. In other arrangements a lock may be returned to a locked condition as soon as the corresponding door is sensed as closed. Of course these approaches are exemplary and in other arrangements other approaches may be used.

In an exemplary arrangement when a lock has been instructed to be unlocked as a result of wireless messages received from the portable wireless device, the exemplary controller operates in accordance with its programming to send messages to cause and to detect the change in the condition of a respective lock from the locked to the unlocked condition. This may be done through associated program instructions which cause the issuance of the instructions to change the condition of the lock to be output by the controller. Alternatively or in addition the change may be detected through an appropriate switch associated with the lock that detects the current lock condition. Alternatively or in addition, the controller may be operative to detect a door sensor sensing a compartment door moving somewhat from the closed position which occurs automatically as a door lock is being changed to an unlocked condition. Responsive at least in part to the change in the locked condition and/or the sensor detecting a compartment door moving from the closed position, the controller is operative to capture image data from a vehicle camera in the respective compartment that has been unlocked and/or accessed to capture and store image data corresponding to images of the interior area of the compartment. This image data is stored in the at least one data store 108 in correlated relation with corresponding time data generated through operation of the processor clock 106 so as to provide an event record of the compartment access as well as stored image data corresponding to images which can be used to show the activity which occurred and the images an individual who conducted such activity. In addition in exemplary arrangements the controller 102 may operate to record in the at least one data store 108 information about the receipt of the data from the portable wireless device which enabled accessing of the particular compartment as well as the instruction data which caused the condition of the lock associated with the compartment to be changed. In this manner the exemplary controller may keep track of events which occurred in connection with the unlocking of compartments and the removal or placement of items into each particular compartment.

Further in exemplary arrangements the controller may also receive signals from the corresponding weight sensor in a particular compartment which indicates a change in the weight of the contents of the particular compartment. As can be appreciated, in exemplary arrangements the removal of items from the compartment can be detected through the weight sensor which sends signals to the controller. The change in weight may correspond with stored data included in the data store 108 which is indicative of the nature of the item that has been removed from or placed in the particular compartment. For example stored data may include data corresponding to the weight associated with the particular item of equipment. The change in weight that is detected through operation of the weight sensor in the particular compartment may be utilized through operation of the controller to identify the particular item or items or item type that has been removed from the compartment. Similarly changes in weight when a compartment is accessed may also be detected and utilized for purposes of determining that a particular item or items or item type has been placed within the compartment. The events corresponding to the changes in weight data and the determination of the item or items or item types placed in or removed from the particular compartment may be stored in correlated relation with time data in the at least one data store through operation of the controller. This enables providing a further record of the items removed from and placed in the storage compartment as well as the times when such events occurred. Such weight based determinations regarding items may also be utilized in conjunction with the captured image data for purposes of documenting the events that have occurred in connection with the removal or placement of items in storage compartments within the vehicle. Such data may be useful for purposes of assuring that all pieces of equipment or other items that are removed from the vehicle are returned to the vehicle at the completion of the work activities, for example. Alternatively in situations where customers of the services provided are charged for items that are removed and delivered as part of the services, the event information corresponding changes in weight as well as image data may be utilized for documenting items provided and processing charges associated therewith. Of course these approaches are exemplary.

Alternatively or in addition, in arrangements that include LIDAR sensors, the LIDAR profile data associated with a given item that is removed from or placed in a particular storage compartment may be stored in the at least one data store and utilized through operation of the controller to determine the particular item or item type that has been removed or placed in a given storage compartment. Such information along with the correlated time information associated with the item removal or placement may be utilized for purposes of tracking the use of the particular item, assuring that such an item is returned to storage within the vehicle and/or assessing charges to the entity to which services are provided. In addition such LIDAR event data may be utilized in connection with image data, weight data and other than data for purposes of verifying that items are appropriately tracked and are not lost. Of course it should further be understood that additional tracking methods such as the use of RFID tags, bar codes or other identifying data applied in connection with items may also be utilized for purposes of determining the nature of items that are removed from or placed in the storage compartments.

In exemplary arrangements in which items of equipment that are removed from the vehicle are required to be returned to the vehicle at the end of the work period or within another time period, such as before the vehicle is removed from the job site, the exemplary controller may operate in accordance with its programming to evaluate the events which involved removal of items of equipment from storage in the vehicle, and whether corresponding events are determined as indicating the return of such items. In the event that a determination is made that removed items have not been returned by a particular time, or when the vehicle is subject to operation to be moved, the at least one controller may operate in accordance with its programming send one or more wireless messages to the portable wireless device. The portable wireless device may operate in accordance with its programming and the receipt of the wireless messages to provide a user with outputs through the display or other output device, advising the user that a particular item of equipment has not been returned to the vehicle. In response to such outputs the user may take appropriate action such as to recover and return the item of equipment into storage in a compartment of the vehicle. Alternatively or in addition, the user may provide other inputs to the portable wireless device indicating the disposition of the particular item of equipment so as to explain the reason that it is not been returned. The controller operates in accordance with its programming to store such data so that the return of the item is documented or the user's indicated disposition of the item is recorded. In some situations, where an appropriate disposition of the particular item has not been indicated by the user, the controller may operate in accordance with its programming to send one or more wireless messages to a remote system to indicate an alert or other condition which is indicative of a loss of the particular item of equipment or other irregular condition. Of course it should be understood that these approaches are exemplary and in other arrangements other approaches may be used.

In exemplary arrangements the controller is also operative to detect situations where unauthorized access is attempted to the vehicle storage compartments. For example, in the event that an access door is moved from the closed position as detected by a door sensor without the corresponding electrical lock having been instructed to be changed through communications with the controller from the locked condition to the unlocked condition, the controller is operative to determine the potential unauthorized access condition. In such circumstances the controller operates in accordance with its programming to cause the audible annunciator 98 to provide an audible output indicative of potential unauthorized access. Alternatively and/or in addition the controller may operate in accordance with its programming to indicate to the user through one or more outputs from the portable wireless device the potential unauthorized access condition. The controller may also operate in accordance with its programming to cause the wireless transceiver to send additional messages to remote systems indicating the detected possible unauthorized access.

In exemplary arrangements, the portable wireless device may also be operated to send wireless messages which cause the controller to operate devices of the system to take other actions. For example in some exemplary arrangements, the user of the portable wireless device may operate the device to receive certain inputs that correspond to an alarm condition. The user may do this for example, if the user observes that unauthorized persons are attempting to access the compartments of the vehicle. Responsive to at least one alarm input to the at least one portable input device, the device is operative to send wireless alarm messages to the controller. The controller is operative at least in part to the wireless alarm messages to cause the alarm annunciator to output an audible signal. Alternatively or in addition the controller may operate in accordance with its programming to cause other audible or visual output devices on the vehicle to operate. This may include flashing lights or other indicators intended to attract attention. Further in exemplary arrangements, the portable wireless device may be operated by the user to receive inputs canceling the alarm condition. A user may do this when the threat that was observed has ended. Responsive at least in part to the at least one alarm termination input, the portable wireless device is operative to output at least one wireless alarm termination message. Responsive at least in part to receipt of the at least one alarm termination message, the controller is operative to cause the audible annunciator and/or other alarm or output devices to cease operation. Of course it should be understood that these approaches are exemplary and in other arrangements other approaches and features may be provided.

In exemplary arrangements if the compartment access has been provided by an authorized individual, a user may provide at least one input through an input device of the portable wireless device to discontinue the audible output. The controller operates in accordance with its programming to record the event of the access as well as data concerning the portable wireless device and/or the user thereof who caused the audible annunciator or other alarm indications to be discontinued.

Alternatively or in addition in some exemplary arrangements the controller may operate to provide captured image data from the vehicle cameras so as to provide outputs corresponding to the image data from the display of the portable wireless device. The wireless image data may correspond to images of the individual who has accessed the particular compartment. In appropriate circumstances where the individual is one who has a key for example that allows them to access the particular compartment, the user of the portable wireless device may recognize the individual and provide appropriate inputs to at least one input device thereof so as to discontinue the audible output or other outputs corresponding to the possible alarm event. In this way the authorized user through operation of the portable wireless device is enabled to avoid the need to personally travel to the vehicle to silence or otherwise remedy the conditions caused by the detection of the possible alarm event.

Also in exemplary arrangements, the user through operation of the portable wireless device is enabled to change conditions so as to place the vehicle in a desired condition remotely. For example if a worker or other individual has a key to access a particular compartment in order to obtain access to a particular item of equipment or material to which they are authorized to gain access, the user of the remote portable wireless device may observe the actions of the individual in performing those activities and return the vehicle compartment to a locked and secure condition after the individual has completed those activities. Alternatively or in addition if the user of the portable wireless device expects the individual who has authorized access via a key to return to the compartment, the user through appropriate inputs to the portable wireless device may provide inputs to the portable wireless device to send wireless messages including instructions that cause the controller to not give an audible output or indicate a possible alarm condition the next time that such access occurs within a particular time period. In some exemplary arrangements the portable wireless device may enable a user to provide inputs so that a suspect alarm condition will not be indicated when the event occurs within a preset time, and thereafter will automatically cause the suspect alarm condition to be indicated if such access thereafter occurs. The controller may further operate to store data regarding each event and change in condition along with the respective time information and the individual responsible therefore in the at least one data store. Of course these approaches are exemplary and other embodiments other approaches may be used.

In some exemplary arrangements the system may enable the user to facilitate access to needed items of equipment or other articles or materials by individuals who do not have access to a portable wireless device or a key that can be utilized to gain access to the storage compartments. Such an arrangement may be useful in situations where a supervisor has access to the portable wireless device but certain laborers or other individuals are not able to access items in storage compartments that they need in order to perform their work. In such arrangements an individual who does not have authorized access to particular storage compartments may provide inputs to the vehicle user interface 76. Such inputs may operate to cause the controller to wirelessly communicate with the portable wireless device that an input has been received at the vehicle user interface. In some exemplary arrangements the controller may operate in accordance with its programming to require that certain identifying data be input to at least one input device of the vehicle user interface before such communication with the remote wireless device is initiated. This may include for example receipt of identifying information from the user at the vehicle user interface. Such information may include an access code that can be manually input to at least one input device on the user interface. Alternatively or in addition the user may provide a biometric input. This may include for example the camera associated with the vehicle user interface capturing a facial image of the user or other data from the user requesting communication. The controller may operate in accordance with its programming to compare the received facial image data to stored biometric user identification data such as facial identification or recognition data to determine if the user is a recognized user. Alternatively or in addition the stored biometric user identification data may include voice identification data such as voiceprint data, or certain spoken words which correspond to a password for an authorized user. The controller may operate in accordance with its programming to determine if voice data provided by user at the vehicle user interface corresponds to an authorized user, such as one of the individuals that is subject to the supervision by the person who is in possession of the portable wireless device. Of course numerous different types of authenticating information may be utilized in connection with identifying the presence of an authorized user at the vehicle user interface.

In response to the inputs to the vehicle user interface 76, and in some exemplary arrangements the determination that the input user data corresponds to an authorized user, the controller is operative to communicate wireless messages with the portable user device. Such wireless device messages may include data corresponding to captured image data as well as captured audio data from the vehicle user interface in which the user at the vehicle may request access to certain items. The remote user may operate the portable wireless device to similarly provide audible and/or visual inputs which are wirelessly transmitted to the user at the vehicle user interface. As a result the portable wireless device is enabled to communicate wireless conference messages which include audio and video information with the vehicle user interface 76 so as to provide the individual at the vehicle user interface with appropriate instructions.

For example in an exemplary arrangement where the individual at the vehicle user interface is requesting access to particular equipment or materials stored in at least one vehicle storage compartment, the individual operating the portable wireless device may provide inputs in a manner like that previously discussed to cause the portable wireless device provide wireless messages that include portable device identification data and lock instruction data to the controller. Responsive to the controller receiving the data included in the wireless messages, the controller is operative in accordance with its programming to cause the particular lock or locks associated with the compartments that the user at the vehicle is authorized to access, to be changed to the unlocked condition. The user of the portable wireless device may provide through the wireless conference messages outputs through the vehicle user interface which comprise instructions to the user at the vehicle to access the particular compartments obtain the items which are needed.

Further in exemplary arrangements the supervisor other user operating the portable wireless device may observe through wireless communications with the controller, display images corresponding to image data captured by the vehicle cameras to observe what the user at the vehicle is doing. This includes observing the images captured by the vehicle cameras within the compartments to assure that the user takes the appropriate items or materials as required for purposes of carrying out their authorized activities. Alternatively or in addition the wireless conference messages communicated between the vehicle user interface and the portable wireless device may also enable the supervisor to instruct the individual at the vehicle to take appropriate actions or to engage in certain activities as required to accomplish certain results. This enables the supervisor to provide the information that the person needs do their work from the supervisor's remote location so as to avoid the supervisor having to travel to the vehicle or otherwise directly instruct the user in proximity to the vehicle concerning the equipment or materials they are required to access and/or activities that they are required to perform. Of course these approaches are exemplary and other arrangements other approaches may be used.

While in some exemplary arrangements the portable device may be operated by a supervisor or other similar authorized personnel located on a jobsite, in other exemplary arrangements the operator of the portable user device may be remotely located from the jobsite. For example a supervisor may be located remotely in a construction office or other location disposed away from the vehicle. In such situations controller 102 operates to send messages through the wireless transceiver through one or more networks to the remotely located user wireless device. This may include communicating messages through Wi-Fi or cellular networks for example. The remote supervisor may operate the portable wireless device to control the access to equipment and materials by workers at the jobsite responsive to requests by the workers that are presented through the vehicle user interface 76 or other user interface. The controller may also operate in accordance with its programming and instructions received from the remote portable wireless device to transmit image data captured through the vehicle cameras to the portable wireless device. This enables the supervisor operating the portable wireless device to selectively display images corresponding to image data captured by the cameras to observe the actions of the workers and assure that they access the appropriate types and amounts of equipment, tools and materials from the vehicle compartments. The portable wireless device may also be operated to maintain access to certain types of items in vehicle compartments during working hours, and then to send wireless messages to the controller to remotely secure the vehicle storage compartments by closing and locking the compartments at the end of the shift or other activities. Further in exemplary arrangements the portable wireless device may be operated to actuate certain alarm sensors or other items that will detect anomalous or unusual conditions such as seismic activity or motion of the vehicle during the time the vehicle is secured, and report such conditions to the portable wireless device, a security agency or other appropriate authorities in response to the detection thereof. Of course these approaches are exemplary and in other arrangements other approaches may be used.

In other exemplary arrangements, the at least one portable wireless device may be operated to cause the controller to operate to provide access to the storage compartments in ways that facilitate access to the compartments by selected individuals. For example in some exemplary arrangements when the supervisor or other user operating the portable wireless device determines that a worker positioned at the vehicle user interface should have access to certain compartments for the shift or other time window in which certain activities will be conducted, the user may provide inputs to the portable wireless device. Such inputs may transmit wireless messages that cause the controller to operate in accordance with its programming to allow the worker to have access to the designated compartments.

In some exemplary arrangements the instructions included in the wireless messages communicated from the portable wireless device, cause the controller to operate to capture facial image data or other visual data regarding the worker, or may identify already stored user identifying data in the at least one data store corresponding to the particular worker. Thereafter for the time window identified through the messages from the portable wireless device, or in some arrangements until a further message from the portable wireless device including data cancelling the authorization is received, the controller may operate in accordance with its programming to identify the worker as authorized to access one or more of the vehicle storage compartments, and will operate to provide the worker with access thereto. This may be done for example, by the controller capturing images from the external vehicle cameras which correspond to the facial features of nearby individuals. In the case of the worker who has been authorized access, identification of the particular worker will cause the compartments in proximity to the authorized worker to automatically change to the unlocked condition so that the worker may have access thereto. Of course in exemplary arrangements when the worker accesses such a compartment, image data is captured by the cameras in the compartment, the external cameras, weight sensors, LIDAR sensors and other applicable sensors along with corresponding time data to is stored in the at least one data store. As a result data corresponding to the events where equipment, tools or material is removed from a compartment by the worker or placed in storage in a compartment by the worker are stored in the at least one data store.

Further in some exemplary arrangements the controller may have associated programming that enables the controller to identify voice commands and/or user gestures. For example in some arrangements when a worker authorized to access certain compartments is identified by facial recognition through images captured by an external camera, the images captured by an external camera of a gesture by the worker of reaching to engage a handle on a particular compartment is recognized through operation of the controller. In response to the controller recognizing the gesture by the user and the associated compartment door, the controller is operative in accordance with its programming to cause the lock associated with the compartment to be changed to the unlocked condition.

Further in some exemplary arrangements in which the controller has associated programming in the at least one data store to identify voice commands, the worker who has been authorized access to at least some of the compartments, may provide audible voice instructions which are recognized through operation of the controller. For example the controller may be operative to identify the worker as authorized to access the compartments and receive a voice command through a microphone of a vehicle user interface that is recognized as an instruction to unlock one or more particular compartments. The controller may operate in accordance with its programming to determine the character of the voice commands from the authorized worker, and responsive at least in part thereto cause the lock or locks associated with the particular compartment to be changed from a locked condition to an unlocked condition.

Further in some exemplary arrangements, the controller may have associated programming to determine additional types of voice commands and to execute actions for the authorized worker in response thereto. For example, the controller may operate in response to a voice command to lock a particular compartment, to cause the associated lock to be changed from the unlocked condition to the locked condition. Further in other exemplary arrangements the controller may be operative to recognize other voice commands or information. This may include for example the authorized worker providing voice inputs regarding equipment or materials removed from or placed in particular compartments. The controller may operate in accordance with its programming to determine the nature of the events corresponding with such voice inputs and to cause event data along with corresponding time data to be stored in the at least one data store in correlated relation. Of course additional types of voice recognition instructions may be utilized to institute actions such as remote communication of the vehicle user interface, the giving of alarms, the securing of the vehicle or voice instructions corresponding to other types of actions that may be recognized through operation of the controller and carried out responsive to operation of the controller.

Further in exemplary arrangements it should be understood that such capabilities of carrying out activities in response to facial recognition of an authorized worker or other user, as well as the carrying out of activities in response to voice commands or instructions, may be extended to a plurality of authorized workers or other users simultaneously. Also in exemplary arrangements the facial recognition capabilities and/or voice instruction capabilities may extend to the user of the portable wireless device as well as one or more workers who are granted such authority through inputs to the portable wireless device. Alternatively and/or in addition, the controller may operate responsive to user identifying data stored in the at least one data store, to only carry out actions in response to voice instructions where the voice instructions are determined through operation of the controller to be from an authorized user that corresponds to voice print data and/or facial recognition data associated with the user. In this manner access to items of equipment, tools or materials may be more securely restricted to assure that access is only granted to authorized individuals. Of course it should be understood that these approaches are exemplary and in other arrangements other approaches may be used.

In some exemplary arrangements the vehicle cameras may also be utilized for purposes of documenting the work activities of workers at a jobsite. For example, workers may operate the vehicle user interface 76 or otherwise have their images or other biometric feature captured through operation of the vehicle cameras or other input devices for purposes of reporting for work at a particular jobsite. User identifying data that is stored in the at least one data store may be utilized for purposes of identifying the time at which a worker reports for work. Likewise the user may operate the vehicle user interface or otherwise be observed through operation of the vehicle cameras or use other input devices for purposes of providing inputs as to when the worker is no longer working at the particular site. Such captured image data or other input data may be stored in correlated relation with the time data in the at least one data store 108 for purposes of verifying the amounts owed to workers for performance of services activities. Of course these approaches are exemplary and in other arrangements other approaches may be used for utilizing components of the system for tracking and documenting worker activities.

In some exemplary arrangements the vehicle may be positioned at a construction or service site for an extended period of time. This may correspond to the duration of a particular project. In such arrangements the vehicle may include supplemental power sources beyond those which are used to power the chassis of the vehicle. This may include for example, a solar array in connection with the body 14 so as to provide electrical power for charging associated batteries so that the electronic control features associated with the body will continue to operate even though the vehicle may not be moved for an extended period of time. Alternatively or in addition an electrical generator may be included in the body 14 for purposes of providing a supplemental power source. In such exemplary arrangements suitable power control circuitry may be provided which may be subject to control through the portable wireless device. For example the controller 102 may operate in accordance with its programming to report to the portable wireless device the status of the electrical power system including the status of the vehicle battery or other batteries associated with the vehicle or the body. The user through the operation of the portable wireless device may monitor the status of the batteries and the electrical system and be provided with alerts regarding conditions which are outside of a range or are approaching the outside of one or more normal operating ranges. Alternatively or in addition, a portable generator located within the body of the vehicle, or the vehicle engine may be subject to remote operation responsive to inputs to the portable wireless device which cause wireless messages to initiate operation so as to provide charging of the battery or batteries. Of course it should be understood that these approaches are exemplary and in other arrangements other approaches may be used.

In exemplary arrangements the vehicle cameras located in the interior area 70 may be operated to provide additional data and functions related to operation of the vehicle. For example the windshield camera 62 may be operated responsive to the controller to capture image data corresponding to windshield images with a field of view from the inside of the cab through the windshield. The controller may operate in accordance with its programming to store the data corresponding to the captured images along with corresponding time data based on the current time as determined through operation of the clock 106. Also in exemplary arrangements controller 102 may cause the GPS circuitry 114 to be operative to acquire location data associated with a current location of the vehicle and store such location data in correlated relation with the time data. Such stored data which is held initially in the at least one data store 108 may be utilized for purposes of determining where the vehicle has been located during corresponding time periods, and the conditions that the vehicle encountered in traveling to or being located in such locations.

Further in exemplary arrangements the camera 66 is operative responsive to the controller 102 to capture images of the instrument panel. The controller is operative to capture data corresponding to the images of the visual outputs provided by the instruments of the instrument panel and store such data in correlated relation with time data in the at least one data store 108. Such data may be utilized for purposes of determining operational factors associated with the vehicle. These may include safe operating practices as well as causation of any operational issues. Further in exemplary arrangements such data may be utilized for purposes of analyzing service hours of the vehicle as well as the need for corrective maintenance or preventative maintenance activities. For example, in some exemplary arrangements the at least one controller may include associated programming that is suitable for analyzing the captured image data from the instrument panel and determining the existence of certain conditions. For example, in exemplary arrangements the controller may be operative to determine when the engine of the vehicle is running, and may record in connection with associated time data, each time that the engine begins running and thereafter stops running. This may be done for example by the controller analyzing images that are captured from the tachometer of the instrument panel. Alternatively or in addition the controller may operate to analyze other instrument panel data. This may include analyzing image data from the speedometer which is indicative of each time that the vehicle is operated to be in a moving condition, and operated to be in a stop condition. The controller may operate in accordance with the programming to determine each time that the vehicle begins moving and stops moving along with associated time data. Alternatively and/or in addition the controller may be operative to analyze image data from a fuel gauge of the instrument panel to determine changes in fuel condition. This may include for example analyzing image data to determine each time that the vehicle has been filled with fuel. In the case of an electrically powered vehicle or hybrid vehicle, the controller may operate to analyze instrument panel outputs indicating a level of charge associated with the vehicle and corresponding time data. Of course the different types of data captured can be analyzed and used for numerous different purposes in exemplary arrangements.

Vehicle cameras 72 which are operative to capture occupant images within the vehicle may be operated by the controller to capture image data corresponding to occupants of the cab such as the driver or passengers therein. The controller may operate to store such occupant image data in correlated relation with time data so that information concerning the occupants of the vehicle cab and the activities performed thereby at different times may be reviewed and analyzed. Alternatively or in addition the image data may be sent to a portable wireless device or other remote system. For example captured occupant image data may be analyzed through operation of the controller to determine if captured facial data corresponds to user identifying data in the at least one data store. The controller may make a determination that the facial recognition data corresponds to an authorized vehicle operator, or authorized occupant of the vehicle for example through such facial recognition data. A determination that an unauthorized occupant or an unauthorized vehicle operator is present may be made through operation of the controller, and the controller operated in accordance with its programming to give remote messages of the condition. Alternatively, an operator of the portable wireless device may view output images and determine an unauthorized individual is present in the cab of the vehicle. The operator of the portable wireless device may send messages that cause the controller to prevent or cease certain operations of the vehicle. Alternatively or in addition, cessation of vehicle operation or limits as to activities that may be conducted may be automatically imposed through operation of the controller responsive to the determination that an unauthorized individual is present. The data captured concerning such events and corresponding image and time data may be stored in the at least one data store. Alternatively or in addition, the controller may operate to determine conditions where an occupant such as the driver leaves the vehicle and subsequently returns. Analysis of the image data through operation of the controller may be used to identify such conditions and store the associated image and time data with such event data in the at least one data store. Such data may be analyzed for purposes of assuring compliance with employer policies and practices. Such data may also be subject to review and analysis for purposes of paying the cab occupants for time worked and/or for determining time spent working for purposes of billing customers for services, for example. Alternatively in situations where the exemplary service vehicle is used for making deliveries or other similar activities, the actions of the occupants can be documented in making such deliveries through the images captured by the numerous vehicle cameras. Of course these approaches are exemplary and in other arrangements other approaches may be used.

Figure 8:
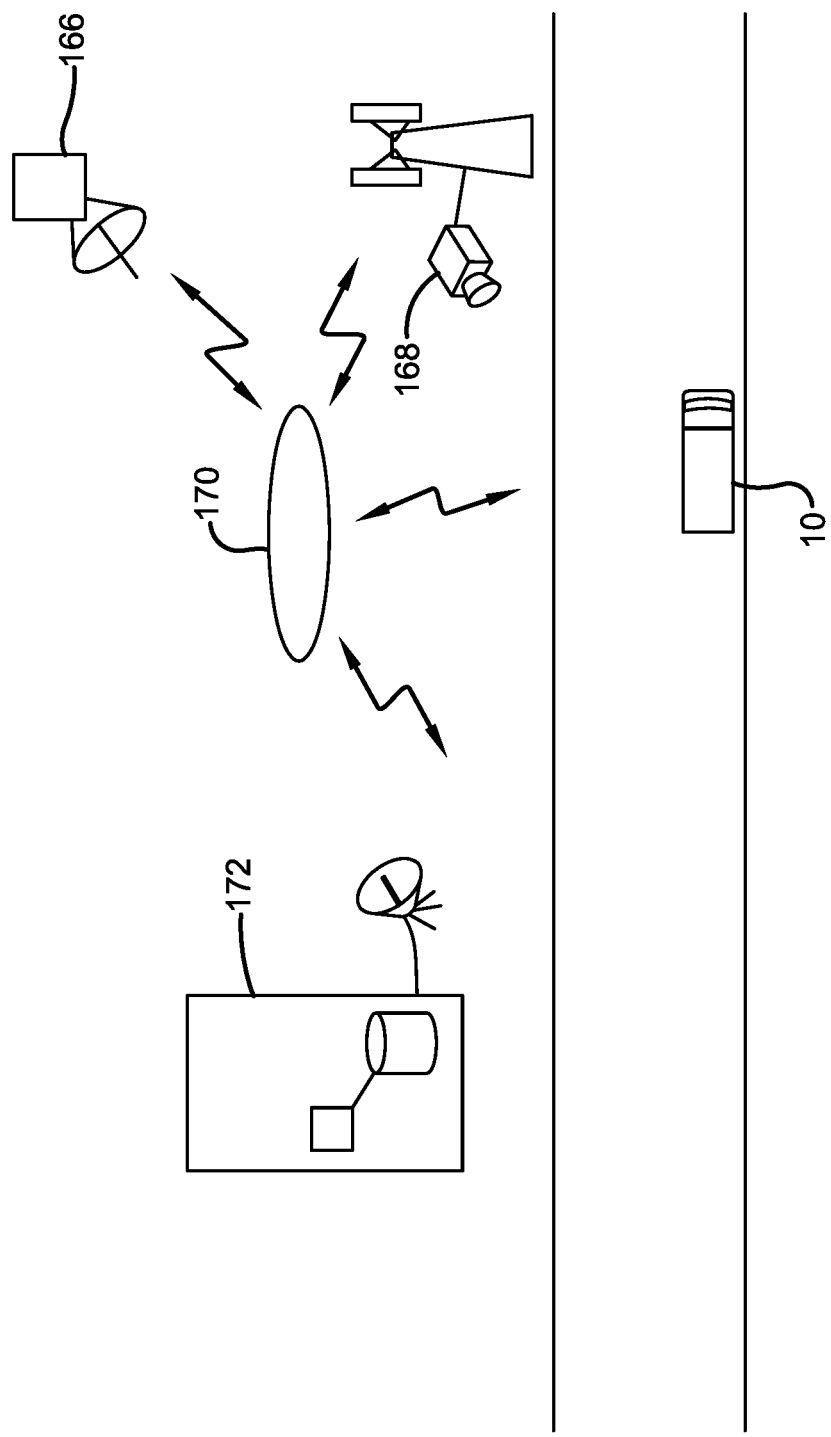
FIG. 8 is a schematic view of a further exemplary service vehicle that communicates with an external camera which captures images of the vehicle, with a GPS location system and with an external system that receives data stored by the exemplary control system.

In other exemplary arrangements the controller may operate in accordance with its programming to determine, or have programmed data stored in the at least one data store, data corresponding to external camera locations. Such external camera location data may correspond to locations of external cameras that operate to capture images of vehicles on an adjacent highway. In exemplary arrangements the controller may operate the GPS locator circuit 114 to determine the current vehicle location. This is done through communication with a GPS satellite system schematically represented 166 in FIG. 8. In circumstances where the current vehicle location corresponds to a field of view of an external camera schematically indicated 168, the controller operates to cause the wireless transceiver to communicate wirelessly through at least one network 170 to receive the captured image data from the external camera 168 that includes the service vehicle. The controller then operates in accordance with its programming to store data corresponding to the external camera image data along with corresponding time data in the at least one data store. This provides further data that enables the location and activities of the service vehicle to be documented. Alternatively or in addition the image data and corresponding time data may be sent to one or more remote systems. Of course it should be understood that in exemplary arrangements only some of the approaches described herein may be utilized for purposes of documenting and tracking vehicle activity.

In exemplary arrangements the event data corresponding to activities for accessing the service vehicle compartments, data corresponding to the detection of removal or placement of items in compartments, and other image and time data that is stored in the at least one data store may be transmitted through operation of the controller to at least one remote system for purposes of providing alerts and/or for remote storage and analysis. This may be done responsive to the programming associated with the controller 102 to cause such event data to be transmitted to a remote system on an immediate basis in the case of alarm conditions and otherwise on a periodic or other planned basis. Alternatively or in addition the controller may be operative to receive wireless messages from a remote system such as system 172 which operate to cause the controller to transmit requested stored event data to the remote system. Such requested data may include for example, selected data related to captured images from the vehicle cameras as well as corresponding time data. Such data may be transmitted responsive to operation of the controller 102 through the wireless transceiver 110. Such transmitted data may be transmitted through one or more wireless networks 170 to the remote system 172. Remote system 172 may operate to analyze the event data, image data and time data for purposes of determining activities associated with the vehicle or the items that are transported therein and removed therefrom. Of course it should be understood that these approaches are exemplary and in other arrangements other approaches may be used.

Thus the exemplary arrangements achieve improved operation, eliminate difficulties encountered in the use of prior devices and systems, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples, and the new and useful concepts are not limited to the exact features shown and described.

Having described features, discoveries and principles of exemplary arrangements, the manner in which they are constructed and operated, and the advantages and useful results attained, the new and useful features, devices, elements, arrangements, parks, combinations, systems, equipment, operations, methods, processes and relationships are set forth in the appended claims.

We claim:

1. Apparatus comprising:
a system operative to selectively control access to a plurality of item storage compartments of a service vehicle,
including
a plurality of door sensors,
wherein each respective door sensor is in operative connection with a respective vehicle compartment door,
wherein each respective door controls access to an interior area of a respective service vehicle compartment via movement of the door between a door open position in which the respective interior area is externally accessible, and a door closed position in which the respective interior area is externally inaccessible,
wherein each respective door sensor is operative to sense if the respective door is in at least one of the door open position and the door closed position,
a plurality of electrically actuated door locks,
wherein each respective door lock is in operative connection with a respective vehicle compartment door,
wherein each door lock is selectively changeable between a locked condition and an unlocked condition,
wherein each door lock is operative in the locked condition to hold the respective door in the door closed position,
an audible annunciator,
a controller wireless receiver,
a controller, wherein the controller includes
at least one processor circuit,
at least one controller data store in operative connection with the at least one processor circuit, wherein the at least one controller data store includes controller identifying data,
wherein the controller is in operative connection with each of the plurality of door locks, each of the plurality of door sensors, the controller wireless receiver, and the audible annunciator,
a portable wireless device,
wherein the portable wireless device includes
at least one portable input device,
a portable transmitter, and
a portable data store, wherein the portable data store includes portable wireless device identifying data,
wherein at least one user input to the at least one portable input device is operative to cause the portable transmitter of the portable wireless device to send at least one portable device wireless message, wherein the at least one portable device wireless message includes data corresponding to:
the portable device identifying data, and
at least one lock instruction,
wherein the controller is operative to cause
the controller wireless receiver to be operable to receive the at least one portable device wireless message,
a determination that the portable device identifying data included in the at least one portable device wireless message has a predetermined relationship to the stored controller identifying data,
responsive at least in part to the determination and the data corresponding to the at least one lock instruction, at least one lock to be changed between the locked condition and the unlocked condition,
the audible annunciator to provide an audible output when a respective lock is in a locked condition and the respective door associated with the respective lock is sensed by the respective door sensor as not in the door closed position.

2. The apparatus according to claim 1 and further comprising
a vehicle user interface, wherein the vehicle user interface is in fixed operative connection with the service vehicle,
wherein the vehicle user interface includes
an interface camera,
an interface display,
an interface microphone,
an interface speaker,
wherein the vehicle user interface is in operative connection with the controller,
a controller wireless transceiver, wherein the controller wireless transceiver includes the controller wireless receiver,
wherein the portable wireless device includes
a portable camera,
a portable display,
a portable microphone,
a portable speaker,
a portable transceiver, wherein the portable transceiver includes the portable transmitter,
wherein respective users of the portable user device and the vehicle user interface are enabled to engage in video and audio communication through wireless conference messages.

3. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller, a controller wireless transceiver, wherein the controller wireless transceiver includes the controller wireless receiver,
wherein the portable wireless device includes
a portable display,
a portable transceiver, wherein the portable transceiver includes the portable transmitter,
wherein the portable display is selectively operative to display images corresponding to image data captured by each of the plurality of vehicle cameras.

4. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein one vehicle camera is operative to capture first compartment image data corresponding to images of a first interior area of a first compartment,
a controller wireless transceiver, wherein the controller wireless transceiver includes the controller wireless receiver,
wherein the portable wireless device includes
a portable display,
a portable transceiver, wherein the portable transceiver includes the portable transmitter,
wherein the portable display is selectively operative to display images corresponding to the first compartment image data.

5. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein one vehicle camera is operative to capture first compartment image data corresponding to images of a first interior area of a first compartment,
a controller wireless transceiver, wherein the controller wireless transceiver includes the controller wireless receiver,
wherein the at least one processor circuit includes a clock, wherein the clock is operative to generate time data,
wherein the controller is operative to cause the first compartment image data and corresponding time data to be stored in correlated relation in the at least one data store.

6. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein the vehicle includes a cab, wherein the cab includes a cab interior and is configured to house a driver of the vehicle,
wherein one vehicle camera is operative to capture cab image data corresponding to images of the cab interior,
a controller wireless transceiver, wherein the controller wireless transceiver includes the controller wireless receiver,
wherein the portable wireless device includes
a portable display,
a portable transceiver, wherein the portable transceiver includes the portable transmitter,
wherein the portable display is selectively operative to display images corresponding to the cab image data.

7. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein the vehicle includes a cab, wherein the cab includes a cab interior and is configured to house a driver of the vehicle,
wherein one vehicle camera is operative to capture cab image data corresponding to images of the cab interior,
wherein the at least one processor circuit includes a clock, wherein the clock is operative to generate time data,
wherein the controller is operative to cause the cab image data and corresponding time data to be stored in correlated relation in the at least one data store.

8. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein the vehicle includes a cab, wherein the cab includes a cab interior and is configured to house a driver of the vehicle,
wherein one vehicle camera is operative to capture cab image data corresponding to images of the cab interior,
wherein the cab includes a windshield, wherein the cab image data corresponds to images within a field of view from inside the cab through the windshield,
wherein the at least one processor circuit includes a clock, wherein the clock is operative to generate time data,
wherein the controller is operative to cause the cab image data and corresponding time data to be stored in correlated relation in the at least one data store.

9. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein the vehicle includes a cab, wherein the cab includes a cab interior and is configured to house a driver of the vehicle,
wherein one vehicle camera is operative to capture cab image data corresponding to images of at least one occupant inside the cab interior,
wherein the at least one processor circuit includes a clock, wherein the clock is operative to generate time data,
wherein the controller is operative to cause the cab image data and corresponding time data to be stored in correlated relation in the at least one data store.

10. The apparatus according to claim 1 and further comprising:
a GPS locator circuit, wherein the GPS locator circuit is operative to determine vehicle location data corresponding to a current vehicle location, wherein the GPS locator circuit is in operative connection with the controller,
wherein the at least one processor circuit includes a clock, wherein the clock is operative to generate time data,
wherein the controller is operative to cause the vehicle location data and corresponding time data to be stored in correlated relation in the at least one data store.

11. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein a first vehicle camera is operative to capture first compartment image data corresponding to images of a first interior area of a first compartment,
wherein a first compartment door is associated with the first compartment,
wherein a first door sensor is associated with the first compartment, wherein the first door sensor is in operative connection with the controller,
wherein the at least one processor circuit includes a clock, wherein the clock is operative to generate time data,
wherein the controller is operative to cause the first compartment image data captured by the first vehicle camera to be stored in the at least one data store responsive at least in part to the first door sensor sensing movement of the first compartment door, wherein the first compartment image data is stored in correlated relation with corresponding time data.

12. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein a first vehicle camera is operative to capture first compartment image data corresponding to images of a first interior area of a first compartment,
wherein a first compartment door is associated with the first compartment,
wherein a first lock is associated with the first compartment door,
wherein the at least one processor circuit includes a clock, wherein the clock is operative to generate time data,
wherein the controller is operative to cause the first compartment image data captured by the first vehicle camera to be stored in the at least one data store responsive at least in part to the first lock being changed from the locked condition to the unlocked condition, wherein the first compartment image data is stored in correlated relation with corresponding time data.

13. The apparatus according to claim 1 and further comprising:
at least one biometric reader, wherein the at least one biometric reader is in operative connection with the controller,
wherein the at least one data store includes stored biometric user identification data,
wherein the controller is operative to cause at least one of the plurality of door locks to change from the locked condition to the unlocked condition responsive at least in part to a determination that biometric data read through operation of the at least one biometric reader has a predetermined relationship to the stored biometric user identification data.

14. The apparatus according to claim 1
wherein the portable wireless device includes at least one biometric reader, wherein the at least one biometric reader is in operative connection with the controller,
wherein the at least one data store includes stored biometric user identification data,
wherein the controller is operative to cause at least one of the plurality of door locks to change from the locked condition to the unlocked condition responsive at least in part to a determination that biometric data read through operation of the at least one biometric reader has a predetermined relationship to the stored biometric user identification data.

15. The apparatus according to claim 1 and further comprising:
at least one camera in fixed operative attached connection with the vehicle, wherein the at least one camera is in operative connection with the controller,
wherein the at least one data store includes stored user facial identification data,
wherein the controller is operative to cause at least one of the plurality of door locks to change from the locked condition to the unlocked condition responsive at least in part to a determination that facial image data captured through operation of the at least one camera has a predetermined relationship to the stored user facial identification data.

16. The apparatus according to claim 1 and further comprising:
at least one microphone in fixed operative attached connection with the vehicle, wherein the at least one microphone is in operative connection with the controller,
wherein the at least one data store includes stored user voice recognition data,
wherein the controller is operative to cause at least one of the plurality of door locks to change from the locked condition to the unlocked condition responsive at least in part to a determination that voice data captured through operation of the at least one microphone has a predetermined relationship to the stored user voice recognition data.

17. The apparatus according to claim 1 and further comprising:
a plurality of vehicle cameras,
wherein the plurality of vehicle cameras are located in disposed locations on the vehicle,
wherein each of the plurality of vehicle cameras is in operative connection with the controller,
wherein one vehicle camera is operative to capture first compartment image data corresponding to images of a first interior area of a first compartment,
a weight sensor,
wherein the weight sensor is in operative connection with the first compartment and is operative to detect weight of contents of the first compartment,
wherein the weight sensor is in operative connection with the controller,
wherein the at least one processor circuit includes a clock, wherein the clock is operative to generate time data,
wherein the controller is operative to cause the first compartment image data and corresponding time data to be stored in correlated relation in the at least one data store responsive at least in part to the weight sensor detecting a change in contents weight in the first compartment.

18. The apparatus according to claim 1 and further comprising:
at least one LIDAR sensor in operative connection with the vehicle,
wherein the at least one LIDAR sensor is in operative connection with the controller,
wherein the at least one LIDAR sensor is operative to generate LIDAR data,
wherein the at least one processor circuit includes a clock, wherein the clock is operative to generate time data,
wherein the at least one data store includes item type identification data, wherein the item type identification data is usable to identify a plurality of different item types,
wherein the controller is operative responsive at least in part to the LIDAR data received from the at least one LIDAR sensor and the item type identification data, to determine an identified item type corresponding to the generated LIDAR data,
wherein the controller is operative to store data corresponding to the identified item type and the corresponding time data in correlated relation in the at least one data store.

19. The apparatus according to claim 1 and further comprising:
at least one LIDAR sensor in operative connection with the vehicle,
wherein the at least one LIDAR sensor is in operative connection with the controller,
wherein the at least one LIDAR sensor is operative to generate LIDAR data,
wherein the at least one data store includes item type identification data, wherein the item type identification data is usable to identify a plurality of different item types,
wherein the controller is operative responsive at least in part to the LIDAR data received from the at least one LIDAR sensor and the item type identification data, to determine an identified item type corresponding to the LIDAR data,
wherein the controller is operative responsive at least in part to the determination to cause at least one of
the audible annunciator to provide an audible output,
at least one wireless message to be sent.

20. The apparatus according to claim 1
wherein one respective vehicle compartment door comprises an interface door, wherein the interface door includes an interface door inside face,
wherein the interface door inside face is in facing relation with the respective interior area of the respective vehicle compartment when the interface door is in the door closed position,
a vehicle user interface including an interface display in attached operative connection with the interface door inside face such that the interface display is externally visible on the service vehicle only when the interface door is in the door open position.

21. The apparatus according to claim 1 and further comprising:
a controller wireless transceiver, wherein the controller wireless transceiver includes the controller wireless receiver,
wherein the at least one processor circuit includes a clock, wherein the clock is operative to generate time data,
a GPS locator circuit, wherein the GPS locator circuit is in operative connection with the controller,
wherein the GPS locator circuit is operative to determine vehicle location data corresponding to a current location of the service vehicle,
wherein the at least one data store includes external camera location data, wherein the external camera location data corresponds to at least one camera location of an external camera positioned to capture images of vehicles on an adjacent highway,
wherein the controller is operative responsive at least in part to the vehicle location data and the external camera location data, to cause the controller wireless transceiver to receive image data from the external camera, wherein the received image data includes image data corresponding to an image of the service vehicle, and to store the data corresponding to the received image data in correlated relation with corresponding time data in the at least one data store.

22. The apparatus according to claim 1 and further comprising:
a controller wireless transceiver, wherein the controller wireless transceiver includes the controller wireless receiver,
wherein the at least one processor circuit includes a clock, wherein the clock is operative to generate time data,
a GPS locator circuit, wherein the GPS locator circuit is in operative connection with the controller,
wherein the GPS locator circuit is operative to determine vehicle location data corresponding to a current location of the service vehicle,
wherein the at least one data store includes external camera location data, wherein the external camera location data corresponds to at least one camera location of an external camera positioned to capture images of vehicles on an adjacent highway,
wherein the controller is operative responsive at least in part to the vehicle location data and the external camera location data, to cause the controller wireless transceiver to receive image data from the external camera, wherein the received image data includes image data corresponding to an image of the service vehicle, and to cause the received image data and the corresponding time data to be sent wirelessly by the controller wireless transceiver to at least one remote system.

23. The apparatus according to claim 1 wherein the portable wireless device comprises a smart phone.

24. Apparatus comprising:
a system operative to selectively control access to a plurality of item storage compartments on a service vehicle, including
a plurality of door sensors, wherein each respective door sensor is in operative connection with a respective vehicle compartment door,
wherein each respective vehicle compartment door is operative to selectively control external access to a respective item storage compartment via movement of the door between a door open position in which the respective item storage compartment is externally accessible, and a door closed position in which the respective item storage compartment is externally inaccessible,
wherein each respective door sensor is operative to sense if the respective door is in at least one of the door open position and the door closed position,
a plurality of electrically actuated door locks, wherein each respective door lock is in operative connection with a respective vehicle compartment door, wherein each door lock is selectively changeable between a locked condition and an unlocked condition, wherein each door lock is operative in the locked condition to hold the respective compartment door in the closed position, an audible annunciator, a wireless transceiver, a controller, wherein the controller includes at least one processor circuit, at least one data store in operative connection with the at least one processor circuit, wherein the at least one data store includes stored identifying data, wherein the controller is in operative connection with each of the plurality of door locks, each of the plurality of door sensors, the wireless transceiver and the audible annunciator, wherein the controller is operative to enable receipt by the controller of at least one wireless device message from a portable wireless device, wherein the portable wireless device includes at least one portable input device, a portable transmitter, and a portable data store wherein the portable data store includes portable device identifying data, wherein at least one user input to the at least one portable input device is operative to cause the portable transmitter of the portable wireless device to send the at least one wireless device message, wherein the at least one wireless device message includes data corresponding to:

the portable device identifying data, and at least one lock instruction, wherein the controller is further operative to cause a determination to be made that the portable device identifying data included in the at least one wireless device message has a predetermined relationship to the stored identifying data, responsive at least in part to the determination and the data corresponding to the at least one lock instruction, cause at least one lock to be changeable from the locked condition to the unlocked condition, cause the audible annunciator to provide an audible output responsive at least in part to a first door sensor sensing an associated first door in other than the door closed position when a first door lock associated with the first door has not been caused to be in the unlocked condition responsive to operation of the controller.

25. The apparatus according to claim 24 wherein the controller is operative to cause the at least one lock to be enabled to be changed from the locked condition to the unlocked condition responsive at least in part to the data corresponding to the at least one lock instruction.

26. The apparatus according to claim 25 and further comprising:

at least one camera in fixed operative connection with the vehicle, wherein the at least one camera is in operative connection with the controller, wherein the at least one controller is operative to cause the wireless transceiver to wirelessly communicate data corresponding to images captured by the at least one camera to the portable wireless device.

27. The apparatus according to claim 26 and further comprising:

a vehicle user interface in fixed operative connection with the vehicle, wherein the vehicle user interface includes an interface camera, an interface display, an interface microphone, an interface speaker, wherein the vehicle user interface is in operative connection with the controller, wherein the controller is operative to enable wireless audio and video communication between the vehicle user interface and the portable wireless device.

28. The apparatus according to claim 27 and further comprising:

the portable wireless device, wherein the portable wireless device comprises a smart phone.

* * * * *